(12) United States Patent
Bhattacharyya et al.

(10) Patent No.: US 10,747,718 B2
(45) Date of Patent: *Aug. 18, 2020

(54) MAPPING STRUCTURE FOR MAINTAINING METADATA FOR SNAPSHOTS IN A VIRTUALIZED STORAGE ENVIRONMENT

(71) Applicant: Nutanix, Inc., San Jose, CA (US)

(72) Inventors: Manosiz Bhattacharyya, San Jose, CA (US); Vinayak Hindurao Khot, Sunnyvale, CA (US); Tabrez Parvez Memon, Santa Clara, CA (US); Kannan Muthukkaruppan, Union City, CA (US)

(73) Assignee: Nutanix, Inc., San Jose, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 15/660,490

(22) Filed: Jul. 26, 2017

(65) Prior Publication Data
US 2017/0322943 A1 Nov. 9, 2017

Related U.S. Application Data

(63) Continuation of application No. 14/278,429, filed on May 15, 2014, now Pat. No. 9,720,921.

(51) Int. Cl.
*G06F 16/00* (2019.01)
*G06F 16/11* (2019.01)
(Continued)

(52) U.S. Cl.
CPC ............ *G06F 16/128* (2019.01); *G06F 9/455* (2013.01); *G06F 9/45533* (2013.01);
(Continued)

(58) Field of Classification Search
CPC ..... G06F 15/17331; G06F 2009/45595; G06F 3/067; G06F 15/167; G06F 16/245;
(Continued)

(56) References Cited

U.S. PATENT DOCUMENTS 7,979,395 B1 7/2011 Aggarwal et al.
8,046,550 B2 10/2011 Feathergill
(Continued)

OTHER PUBLICATIONS

Non-final Office Action dated Jun. 4, 2015 for related U.S. Appl. No. 13/926,921.
(Continued)

*Primary Examiner* — Yicun Wu
(74) *Attorney, Agent, or Firm* — Vista IP Law Group, LLP

(57) ABSTRACT

A method for maintaining a mapping structure for maintaining metadata for snapshots in a virtualized storage environment, includes taking a snapshot of a virtual disk, generating an entry in a metadata structure for the snapshot, wherein the entry includes metadata for blocks in the snapshot that have been modified since a preceding snapshot and lazily generating an entry in the mapping structure for the snapshot, wherein the entry includes values for each block in the snapshot, wherein a value for a block indicates a presence of metadata in the metadata structure for the block or an absence of metadata in the metadata structure for the block.

21 Claims, 15 Drawing Sheets

(51) Int. Cl.
  *G06F 16/174* (2019.01)
  *G06F 16/18* (2019.01)
  *H04L 12/931* (2013.01)
  *G06F 9/455* (2018.01)
  *G06F 9/48* (2006.01)
  *G06F 9/50* (2006.01)

(52) U.S. Cl.
  CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 16/1748* (2019.01); *G06F 16/1873* (2019.01); *H04L 49/356* (2013.01); *G06F 2009/4557* (2013.01); *G06F 2009/45562* (2013.01); *G06F 2009/45575* (2013.01); *G06F 2009/45579* (2013.01); *G06F 2009/45583* (2013.01); *G06F 2009/45595* (2013.01)

(58) Field of Classification Search
  CPC .. G06F 16/86; G06F 16/9014; G06F 16/9024; G06F 2201/84; G06F 3/0665; G06F 3/0689; G06F 9/45558; G06F 11/1451; G06F 15/173; G06F 16/00; G06F 2009/45562; G06F 2009/45579; G06F 2201/815; G06F 3/0604; G06F 3/0605; G06F 3/0607; G06F 3/065; G06F 3/0661; G06F 3/0664; G06F 11/00; G06F 11/1092; G06F 11/1453; G06F 11/20; G06F 11/203; G06F 11/2058; G06F 11/2069; G06F 11/2089; G06F 11/2094; G06F 11/2097; G06F 15/16; G06F 16/128; G06F 16/2255; G06F 1/24; G06F 2003/0694; G06F 2009/45583; G06F 2201/835; G06F 3/0619; G06F 3/0631; G06F 3/0635; G06F 9/45533
  See application file for complete search history.

(56) References Cited

U.S. PATENT DOCUMENTS

| | | |
|---|---|---|
| 8,135,930 B1 | 3/2012 | Mattox et al. |
| 8,151,263 B1 | 4/2012 | Venkitachalam et al. |
| 8,166,265 B1 | 4/2012 | Feathergill |
| 8,234,469 B2 | 7/2012 | Ranade |
| 8,335,902 B1 | 12/2012 | Feathergill |
| 8,364,858 B1 | 1/2013 | Martin et al. |
| 8,549,518 B1 | 10/2013 | Aron et al. |
| 8,601,473 B1 | 12/2013 | Aron et al. |
| 8,656,386 B1 | 2/2014 | Baimetov |
| 8,756,598 B1 | 6/2014 | Costea et al. |
| 8,762,967 B2 | 6/2014 | Kim |
| 8,850,130 B1 | 9/2014 | Aron et al. |
| 8,914,595 B1 | 12/2014 | Natanzon |
| 9,009,106 B1 | 4/2015 | Aron et al. |
| 9,043,567 B1 | 5/2015 | Modukuri et al. |
| 9,069,708 B2 | 6/2015 | Gill et al. |
| 9,135,127 B1 | 9/2015 | Havemose |
| 9,348,634 B2 | 5/2016 | Allen |
| 9,377,964 B2 | 6/2016 | Sharma et al. |
| 9,396,200 B2 | 7/2016 | Jacoby et al. |
| 9,430,333 B2 | 8/2016 | D'amato et al. |
| 9,501,233 B2 | 11/2016 | Harris et al. |
| 9,547,562 B1 | 1/2017 | Feathergill et al. |
| 9,588,870 B2 | 3/2017 | Marron et al. |
| 9,772,866 B1 | 9/2017 | Aron et al. |
| 9,823,973 B1 | 11/2017 | Natanzon |
| 9,886,215 B1 | 2/2018 | Ramachandran et al. |
| 1,003,873 A1 | 7/2018 | Pearl et al. |
| 10,061,656 B2 | 8/2018 | Zou |
| 10,423,609 B1 | 9/2019 | Strauss |
| 2004/0143832 A1 | 7/2004 | Yamamoto et al. |
| 2005/0055603 A1 | 3/2005 | Soran et al. |
| 2006/0101189 A1 | 5/2006 | Chandrasekaran et al. |
| 2007/0074208 A1 | 3/2007 | Ling |
| 2007/0079298 A1 | 4/2007 | Tian |
| 2007/0174915 A1 | 7/2007 | Gribble et al. |
| 2007/0244938 A1 | 10/2007 | Micheal et al. |
| 2008/0052331 A1 | 2/2008 | Ogawa et al. |
| 2008/0065854 A1 | 3/2008 | Schoenberg et al. |
| 2008/0115143 A1 | 5/2008 | Shimizu et al. |
| 2008/0244028 A1 | 10/2008 | Le |
| 2009/0125678 A1 | 5/2009 | Tokuda et al. |
| 2009/0260007 A1 | 10/2009 | Beaty et al. |
| 2010/0011178 A1 | 1/2010 | Feathergill |
| 2010/0077142 A1 | 3/2010 | Fienblit et al. |
| 2010/0077165 A1 | 3/2010 | Lu et al. |
| 2010/0162242 A1 | 6/2010 | Grouzdev |
| 2010/0287407 A1 | 11/2010 | Basu et al. |
| 2010/0299309 A1 | 11/2010 | Maki et al. |
| 2011/0047340 A1 | 2/2011 | Olson et al. |
| 2011/0107052 A1* | 5/2011 | Narayanasamy ..... G06F 3/0608 711/171 |
| 2011/0154378 A1 | 6/2011 | Kishan et al. |
| 2011/0219201 A1 | 9/2011 | Ranade |
| 2011/0302226 A1 | 12/2011 | Abadi et al. |
| 2011/0307531 A1 | 12/2011 | Gaponenko et al. |
| 2012/0005668 A1 | 1/2012 | Serizawa |
| 2012/0117299 A1 | 5/2012 | Waldspurger |
| 2012/0144391 A1 | 6/2012 | Ueda |
| 2012/0167082 A1 | 6/2012 | Kumar |
| 2012/0188592 A1 | 7/2012 | Handley |
| 2012/0278799 A1* | 11/2012 | Starks ..................... G06F 9/455 718/1 |
| 2012/0331462 A1 | 12/2012 | Falko |
| 2013/0179574 A1 | 7/2013 | Calder et al. |
| 2013/0198489 A1 | 8/2013 | Branson et al. |
| 2013/0227558 A1 | 8/2013 | Du |
| 2014/0195753 A1 | 7/2014 | Khatri et al. |
| 2014/0229949 A1 | 8/2014 | Cai |
| 2014/0282824 A1 | 9/2014 | Lango et al. |
| 2014/0317265 A1 | 10/2014 | James et al. |
| 2014/0325170 A1 | 10/2014 | Aswathanarayana et al. |
| 2014/0359043 A1* | 12/2014 | Gao ..................... G06F 15/167 709/212 |
| 2014/0365740 A1 | 12/2014 | Vasilyev et al. |
| 2015/0180714 A1 | 6/2015 | Chunn |
| 2015/0188775 A1 | 7/2015 | Van Der Walt |
| 2015/0248402 A1 | 9/2015 | Patterson, III |
| 2015/0317177 A1 | 11/2015 | Hussain et al. |
| 2016/0004451 A1 | 1/2016 | Lakshman et al. |
| 2016/0054774 A1 | 2/2016 | Song et al. |
| 2016/0124764 A1 | 5/2016 | Nithrakashyap et al. |
| 2016/0124972 A1 | 5/2016 | Jain et al. |
| 2016/0202916 A1 | 7/2016 | Cui et al. |
| 2016/0203013 A1 | 7/2016 | Bayapuneni et al. |
| 2016/0292074 A1 | 10/2016 | Awasthi et al. |

OTHER PUBLICATIONS

Final Office Action dated Dec. 22, 2015 for related U.S. Appl. No. 13/926,921.
International Search Report and Written Opinion dated May 30, 2014 for related PCT Patent Application No. PCT/US13/78389.
Non-final Office Action dated Mar. 12, 2015 for related U.S. Appl. No. 13/918,660.
Final Office Action dated Aug. 31, 2015 for related U.S. Appl. No. 13/918,660.
Non-final Office Action dated Jan. 6, 2016 for related U.S. Appl. No. 13/928,097.

(56) References Cited

OTHER PUBLICATIONS

Final Office Action dated May 10, 2016 for related U.S. Appl. No. 13/928,097.
International Search Report and Written Opinion dated Jun. 22, 2015 for related PCT Patent Application No. PCT/US2015/020144.
Non-final Office Action dated Sep. 28, 2015 for related U.S. Appl. No. 14/206,924.
Final Office Action dated May 19, 2016 for related U.S. Appl. No. 14/206,924.
Non-final Office Action dated Jun. 3, 2016 for related U.S. Appl. No. 14/278,429.
Non-final Office Action dated Jun. 7, 2016 for related U.S. Appl. No. 13/918,660.
Advisory Action dated Aug. 5, 2016 for related U.S. Appl. No. 14/206,924.
Non-final Office Action dated Aug. 11, 2016 for related U.S. Appl. No. 13/926,921.
Final Office Action dated Oct. 3, 2016 for related U.S. Appl. No. 13/918,660.
Xiao, et al., "Implementaion and Performance Evaluation of Two Snapshot Methods on iSCSI Target Storages", 2006, 11 pages.
Xiv Storage Reinvented, Snapshots Reinvented IBM XIV Storage System, Copyright IBM Corporation 2008, 17 pages.
Pai, Vivek, "COS 318: Operation Systems Snapshot and NFS", Computer Science Department, Princeton University, 2011, 24 pages.
Agarwal, et al., "Snapshots in Hadoop Distributed File System", 2011, 5 pages.
Navarro, et al., "FuSnap: Fuzzy Control of Logical Volume Snapshot Replication for Disk Arrays", Copyright 2010, 9 pages.
Sankaran et al., "Volume Shadow Copy Service", Storage Environment, Power Solutions, Mar. 2004, 4 pages.
"CA ARCserve Backup for Windows", Microsoft Volume Shadow Copy Service Guide r15, Copyright 2010.
Overland Storage, "Hardware Provider for Microsoft Volume Shadow Copy Service (VSS) User Guide", Ultamus Raid, Copyright 2008, 20 pages.
IBM, "IBM XIV Provider for Microsoft Windows Volume Shadow Copy Service" Version 2.4.0, Release Notes, Copyright 2009, 2013, 18 pages.
Fujitsu Limited, "VSS Backup Solution for Exchange Server 2007 and Symantec Backup Exec 12.5 using ETERNUS VSS Hardware Provider" System Configuration Guide, Copyright 2009, 45 pages.
Final Office Action dated Nov. 30, 2016 for related U.S. Appl. No. 14/278,429.
Notice of Allowance and Fee(s) due dated Jan. 25, 2017 for related U.S. Appl. No. 13/918,660.
Final Office Action dated Mar. 2, 2017 for related U.S. Appl. No. 13/926,921.
Notice of Allowance dated Mar. 9, 2017 for related U.S. Appl. No. 14/278,429.
Notice of Allowance dated Mar. 27, 2017 for related U.S. Appl. No. 13/928,097.
Advisory Action dated May 25, 2017 for related U.S. Appl. No. 13/926,921.
Non-Final Office Action dated Dec. 14, 2017 for related U.S. Appl. No. 15/178,504.
Li et al. "iROW: An Efficient Live Snapshot System for Virtual Machine Disk", 2012 IEEE, pp. 376-383.
Yu et al. "SNPdisk: An Efficient Para-Virtualization Snapshot Mechanism for Virtual Disks in Private Clouds", 2011 IEEE, pp. 20-26.
Chuang et al. "Generating Snapshot Backups in Cloud Virtual Disks", 2014 IEEE, pp. 1860-1863.
Extended European Search Report dated Oct. 16, 2017 for EP Application No. 15760880.3, 10 pages.
Final Office Action dated Jul. 12, 2018 for related U.S. Appl. No. 15/178,504.
[Nutanix-078] U.S. Appl. No. 15/160,347, filed May 20, 2016, 62 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Nov. 15, 2018 for related U.S. Appl. No. 14/206,924, 16 pages.
Notice of Allowance dated Dec. 10, 2018 for related U.S. Appl. No. 15/178,504, 8 pages.
European Office Action dated Mar. 26, 2019 for related EP Application No. 15760880.3.
Non-Final Office Action dated May 15, 2019 for related U.S. Appl. No. 15/178,504.
Non-Final Office Action dated May 23, 2019 for related U.S. Appl. No. 15/981,873.
Final Office Action dated Aug. 8, 2019 for related U.S. Appl. No. 14/206,924.
Final Office Action dated Oct. 31, 2019 for related U.S. Appl. No. 15/981,873.
Cano, I. et al., "Curator: Self-Managing Storage for Enterprise Clusters", 14th USENIX Symposium on Networked Systems Design and Implementation, NSDI '17, (Mar. 27, 2017).
Notice of Allowance dated Dec. 3, 2019 for related U.S. Appl. No. 15/178,504.
Kangarlou et al. "Taking Snapshots of Virtual Networked Environments", 2007 ACM, 3 pages.
Huang et al. "VMCSnap: Taking Snapshots of Virtual Machine Cluster with Memory Deduplication", 2014 IEEE, pp. 314-319.
Non-Final Office Action dated Mar. 26, 2020 for related U.S. Appl. No. 15/365,662.

* cited by examiner

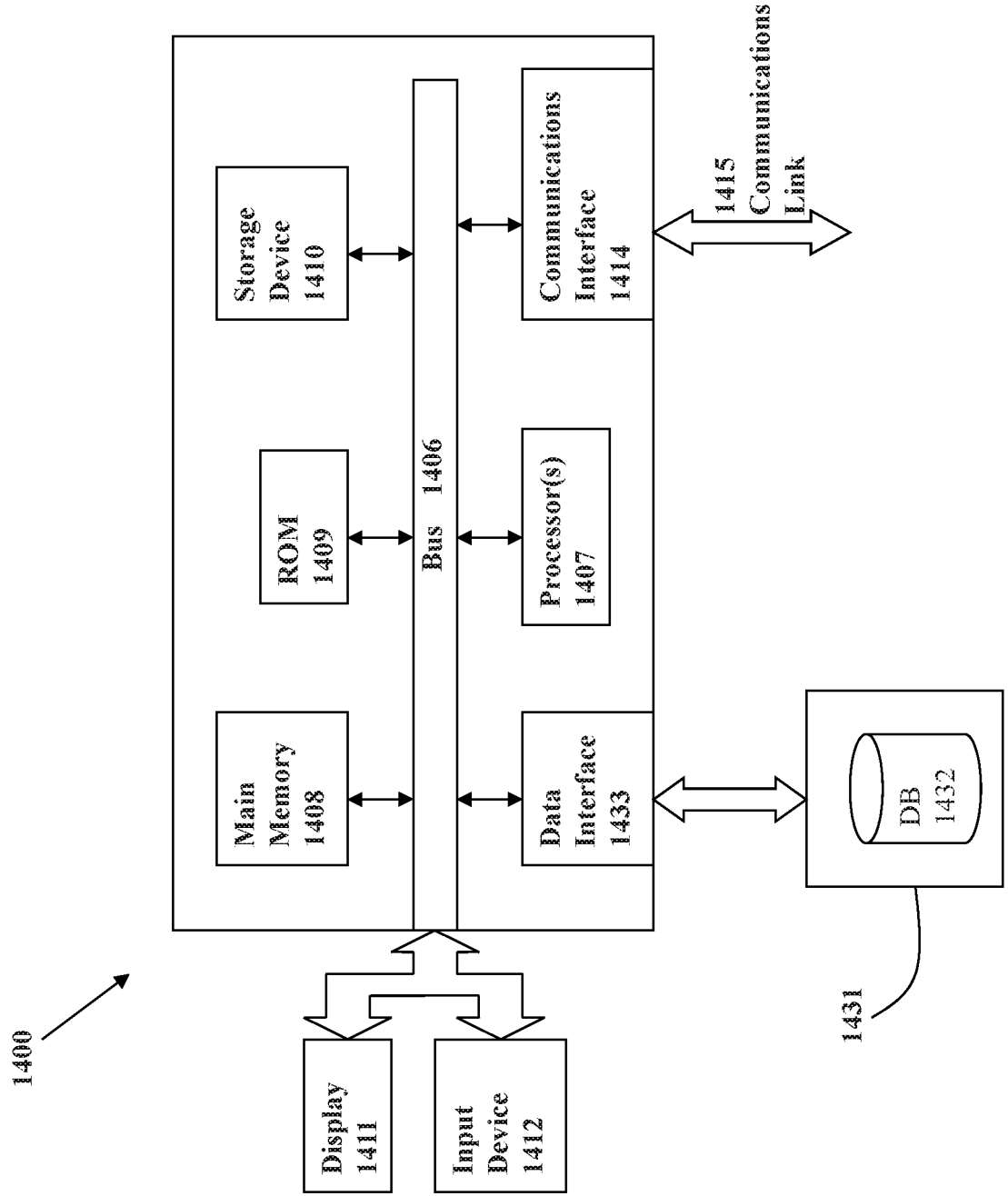

MAPPING STRUCTURE FOR MAINTAINING METADATA FOR SNAPSHOTS IN A VIRTUALIZED STORAGE ENVIRONMENT

CROSS REFERENCE TO RELATED APPLICATIONS

The present application is a continuation application of U.S. patent application Ser. No. 14/278,429, filed on May 15, 2014. The present application is related to U.S. Pat. No. 8,601,473, issued on Dec. 3, 2013, entitled "ARCHITECTURE FOR MANAGING I/O AND STORAGE FOR A VIRTUALIZATION ENVIRONMENT", which is hereby incorporated by reference in its entirety.

FIELD

This disclosure concerns a mechanism for maintaining metadata for snapshots in a virtualized storage environment, and in particular to a mapping structure for maintaining metadata for snapshots in a virtualized storage environment.

BACKGROUND

In the computer science field, a "snapshot" is a term that is used to refer to the state of a set of data at a particular point in time. There are many reasons to implement snapshots of different data. For example, it is often desirable to implement snapshots of an entire disk drive. The snapshot of the disk drive may be useful, for example, to permit distribution and/or backup of a consistent disk image across many devices in a given system or computing environment.

Many types of data and storage management systems can be used to implement snapshots. Different types of volume managers and file systems can be used to implement and maintain snapshots. Such storage management systems that may be used to implement snapshots include, for example, logical volume manager in UNIX-based systems.

One type of storage management system that may implement snapshots is a virtualized storage management system. In a virtualized storage management system, a number of virtual disks ("vDisks") may be structured from physical storage devices and exposed to virtual machines running within the system. Each vDisk may be broken up into equal sized units called vDisk blocks.

In maintaining vDisks for the virtualized storage management system, snapshots of a given vDisk may be periodically taken. Whenever a snapshot is taken for a vDisk, a number of steps occur atomically. These steps include: 1) providing the snapshot of the vDisk a name and a version number, 2) marking the snapshot immutable, and 3) making the live vDisk a child of the snapshot.

Metadata for each vDisk is maintained in order to allow for the physical data associated with the vDisk to be located. Such metadata is maintained in a mapping structure known as a vDisk Block Map. The vDisk Block map includes metadata for each block of a given vDisk, and metadata is kept for each snapshot of a given vDisk. For a given snapshot of a vDisk, only metadata related to blocks of the vDisk that have been modified (e.g., by a write operation) since the preceding snapshot (e.g., parent snapshot) of the vDisk are maintained in the vDisk Block map for that snapshot. Similarly, for the live vDisk, only metadata related to blocks of the vDisk that have been modified since the latest snapshot are maintained in the vDisk Block map. Said otherwise, if a vDisk block for a given snapshot hasn't changed since the preceding snapshot was taken, then no metadata for that vDisk block of the given snapshot is maintained.

The absence of metadata for a vDisk block of a given snapshot implies that a corresponding parent snapshot must be traversed in order to obtain that metadata for the vDisk block. As more and more snapshots of a vDisk are taken, and the snapshot chain/tree grows deeper, the ability to efficiently perform read operations on the vDisk using the vDisk Block Map substantially declines. For example, obtaining metadata for a given vDisk block to fulfill a read request may require traversing several levels of the vDisk Block Map.

One approach for mitigating the read performance of vDisks, involves performing an operation which copies over metadata from parent snapshots to child snapshots or from parent snapshots to the live vDisk, such that all metadata for blocks of a vDisk may be available for a given snapshot or for the live vDisk. However, by making copies of metadata causes unnecessary metadata bloating due to the duplication of redundant information. Such bloating wastes physical storage space (e.g., SSD space) and also reduces cache capacity for effectively holding the metadata.

Therefore, there is a need for an efficient approach for maintaining metadata for snapshots.

SUMMARY

Embodiments of the present invention provide an approach for maintaining metadata for snapshots in a virtualized storage environment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 11 is a block diagram of an illustrative computing system suitable for implementing an embodiment of the present invention.

DETAILED DESCRIPTION OF THE EMBODIMENTS OF THE INVENTION

Embodiments of the present invention provide an approach for maintaining metadata for snapshots in a virtualized storage environment.

In the computer science field, a "snapshot" is a term that is used to refer to the state of a set of data at a particular point in time. There are many reasons to implement snapshots of different data. For example, it is often desirable to implement snapshots of an entire disk drive. The snapshot of the disk drive may be useful, for example, to permit distribution and/or backup of a consistent disk image across many devices in a given system or computing environment.

Many types of data and storage management systems can be used to implement snapshots. Different types of volume managers and file systems can be used to implement and maintain snapshots. Such storage management systems that may be used to implement snapshots include, for example, logical volume manager in UNIX-based systems.

One type of storage management system that may implement snapshots is a virtualized storage management system. In a virtualized storage management system, a number of virtual disks ("vDisks") may be structured from physical storage devices and exposed to virtual machines running within the system.

Figure 1:
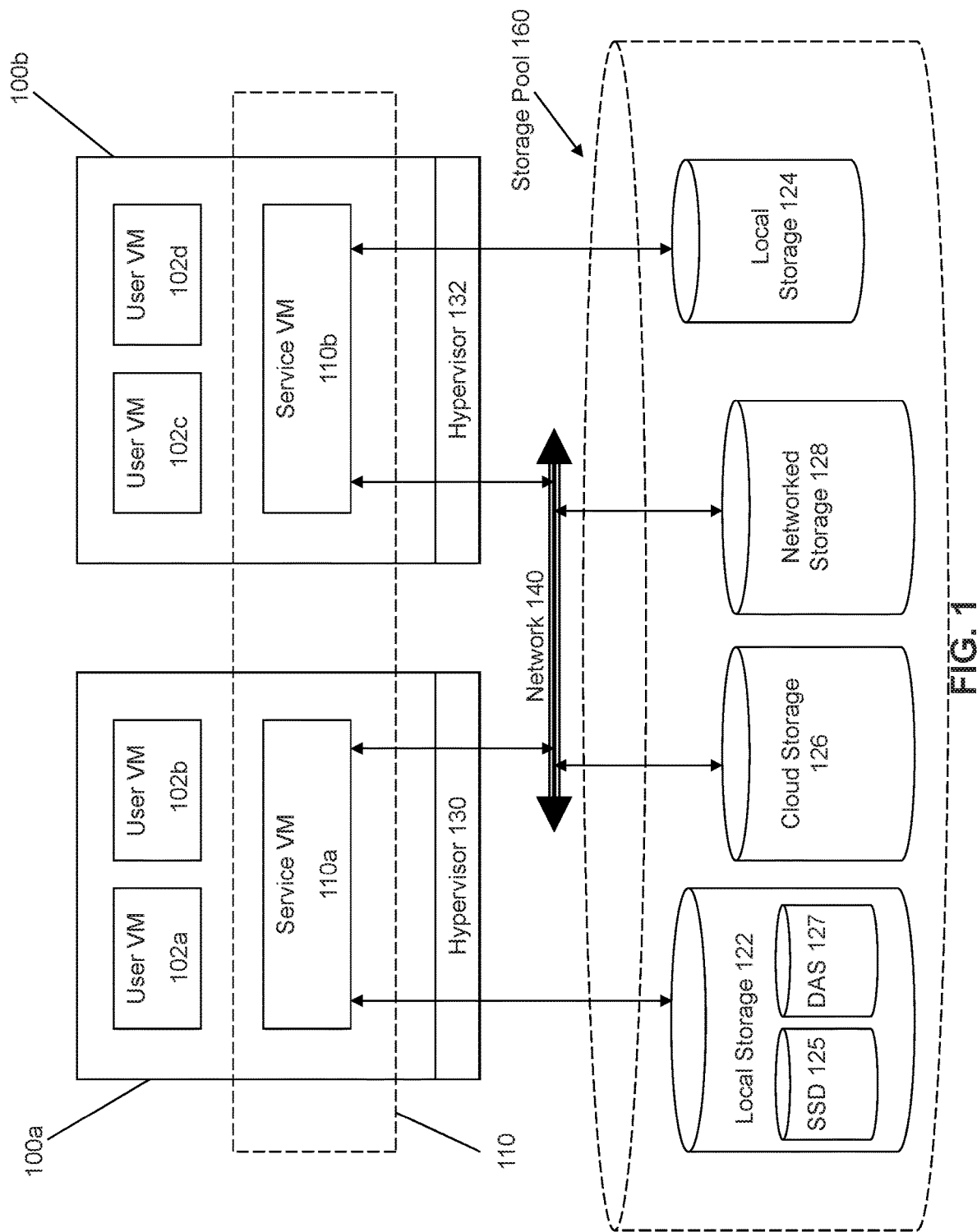
FIG. 1 illustrates an architecture for implementing storage management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100*a* and 100*b* that manages multiple-tiers of storage. The multiple tiers of storage include storage that is accessible through a network 140, such as cloud storage 126 or networked storage 128 (e.g., a SAN or "storage area network"). The present embodiment also permits management of local storage 122/124 that is within or directly attached to the server and/or appliance. Examples of such storage include SSDs 125 or HDDs ("Hard disk drives") 127. These collected storage devices, both local and networked, form a storage pool 160. Virtual disks can be structured from the storage devices in the storage pool 160, as described in more detail below. Each server 100*a* or 100*b* runs virtualization software, such as the ESX product available from VMWare. The virtualization software includes a hypervisor 130/132 to manage the interactions between the underlying hardware and the one or more user VMs 102*a*, 102*b*, 102*c*, and 102*d* that run client software.

A special VM 110*a*/110*b* is used to manage storage and I/O activities according to some embodiment of the invention, which is referred to herein as a "Service VM". The Service VMs 110*a*/110*b* implements a storage controller in user space on the various servers 110*a* and 110*b*, and work together to form a distributed system 110 that manages all the storage resources, including the locally attached storage 122/124, the networked storage 128, and the cloud storage 126.

Each Service VM 110*a-b* exports one or more virtual disks that appear as disks to the client VMs 102*a-d*. This is exposed either as an iSCSI LUN or an NFS file. These disks are virtual, since they are implemented by the software running inside the Service VMs 110*a-b*. Thus, to the user VMs 102*a-d*, the Service VMs 110*a-b* appear to be acting as a clustered storage appliance that exports virtual disks. All user data (including the operating system) in the client VMs 102*a-d* resides on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Service VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression.

Figure 2:
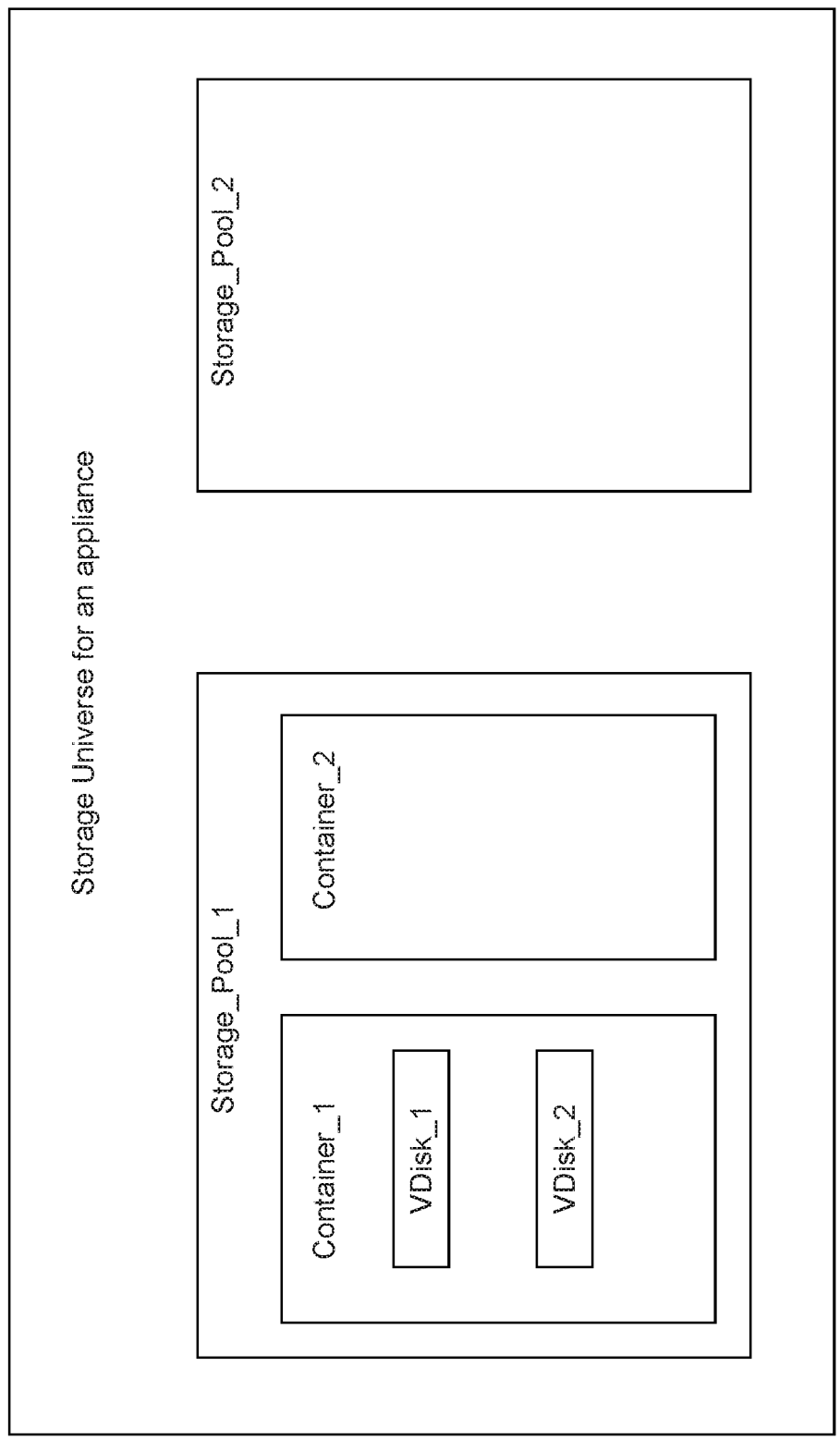
FIG. 2 illustrates the storage hierarchy of the storage objects according to some embodiments of the invention.

For easy management of the appliance, the storage is divided up into abstractions that have a hierarchical relationship to each other. FIG. 2 illustrates the storage hierarchy of the storage objects according to some embodiments of the invention, where all storage in the storage appliance collectively forms a Storage Universe. These storage devices may encompass any suitable devices, such as server-internal SSDs and HDDs, and network-attached SAN or Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make one storage pool with all the disks in the storage universe in that pool. However, the principal idea behind dividing up the storage universe is to provide mutual exclusion when accessing the disk resources.

This may be one approach that can be taken to implement QoS techniques. For example, one rogue user may result in lots of random IO activity on a hard disk—thus if other users are doing sequential IO, they still might get hurt by the rogue user. Enforcing exclusion through storage pools might be used to provide hard guarantees for premium users. Another reason to use a storage pool might be to reserve some disks for later use.

In some embodiments, the container abstraction specifies a de-duplication domain. That is, all de-duplication is done for data stored within a container. Data in different containers is not de-duplicated even if it is the same. A container is assigned one or more storage pools—this defines the disks where the data for that container will be stored. A container supports several configuration parameters that determine how the data on that container is treated, including for example:

1. Replication factor: All data in a container is replicated based on this replication factor. Replicas are placed on different servers whenever possible.
2. Erasure code parameters: While all data is written initially based on the specified replication factor, it may be converted later to use erasure coding (e.g., Reed Solomon encoding) to further save on storage capacity. The data contraction policy on the VDisks enforces when the data is converted to use the erasure encoding.
3. Encryption type: All data in a container is encrypted based on the specified encryption policy if any.
4. Compression type: Data in a container is compressed based on the given compression type. However, when to compress is a policy that's specified on individual VDisks assigned to a container. That is, compression may be done inline, or it may be done offline. See the VDisk configuration parameters in the next subsection.
5. Max capacity: This parameter specifies the max total disk capacity to be used in each tier in the assigned storage pools.
6. Min reserved capacity (specified for each tier): This parameter is also specified for each tier in the assigned storage pools. It reserves a certain amount of disk space on each tier for this container. This ensures that that disk space would be available for use for this container irrespective of the usage by other containers.
7. Min total reserved capacity: This is the minimum reserved across all tiers. This value should be greater than or equal to the sum of the min reserved capacity per tier values.
8. Max de-duplication extent size: The Rabin fingerprinting algorithm breaks up a contiguous space of data into variable sized extents for the purpose of de-duplication. This parameter determines the max size of such extents.
9. Stripe width: To get high disk bandwidth, it is important to stripe data over several disks. The stripe width dictates the number of extents corresponding to a contiguous VDisk address space that'll be put in a single extent group.
10. Tier ordering: All tiers in the assigned storage pools are ordered relative to each other. Hot data is placed in the tier highest up in the order and migrated to other tiers later based on the ILM ("Information Lifecycle Management") policy. A different tier ordering may be specified for random IO as opposed to sequential IO. Thus, one may want to migrate data to the SSD tier only for random IO and not for sequential IO.
11. ILM policy: The ILM policy dictates when data is migrated from one tier to the tier next in the tier ordering. For example, this migration may start when a given tier is more than 90% full or when the data on that tier is more than X days old.

VDisks are the virtual disks that are exported to user VMs by the Service VMs. A VDisk is a software abstraction that manages an address space of S bytes where S is the size of such a virtual device. Each service VM might export multiple VDisks. A user VM might access several VDisks. Typically, all the VDisks exported by a service VM are accessed only by the user VMs running on that server node. A VDisk is a assigned a unique container at creation time. The data in the VDisk is thus managed according to the configuration parameters set on the container. Some additional configuration parameters are specified on the VDisk itself. These are:

1. De-duplication: This specifies whether de-duplication is to be used for this VDisk. However, when de-duplication is used is determined by the data contraction policy.
2. Data contraction policy: The data contraction policy controls when de-duplication, compression, and Reed-Solomon encoding is applied (if any of them are specified). De-duplication and compression may be applied in-line or out-of-line. If out-of-line, the data contraction policy specifies the time when deduplication/compression are applied (e.g., X days). The data contraction policy may specify a different time for doing Reed-Solomon than for deduplication/compression. Note that if both deduplication and compression are specified, then data would be de-duplicated and compressed at the same time before writing to disk.
3. Min total reserved capacity: This is the minimum reserved capacity for this VDisk across all the storage tiers. The sum of all min total reserved capacity parameters for the VDisks in a container should be less than or equal to the min total reserved capacity set on the container.
4. vDisk block size: The vDisk address space is divided into equal sized blocks. It should be less than or equal to the stripe width parameter on the container. A relatively large vDisk block size (e.g., 128 KB) helps reduce the metadata that is maintained.
5. vDisk row blocks: The metadata of a vDisk are conceptually divided into rows. Each row is hash-partitioned onto one metadata server residing in some Service VM in this distributed system. This parameter controls how many blocks of this vDisk are in one row.
6. VDisk Capacity: This is the size (in bytes) of the VDisk address space. This effectively controls the size of disk that an external user VM sees.
7. QoS parameters: Each VDisk may specify a priority and a fair share. Competing IO requests from various VDisks shall be scheduled based on this priority and fair share.

As noted above, embodiments of the invention can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments of the invention, the basic unit of de-duplication is the extent, which is a contiguous portion of storage on a given storage device. Multiple extents can be collected together and stored within an "extent group."

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations and to avoid the number of rows in the metadata from bloating.

Additional details regarding networked virtualization environments for storage management are described in U.S. Pat. No. 8,601,473, issued on Dec. 3, 2013, entitled "ARCHITECTURE FOR MANAGING I/O AND STORAGE FOR A VIRTUALIZATION ENVIRONMENT", which is hereby incorporated by reference in its entirety.

Metadata is maintained by the set of Service VMs to track and handle the data and storage objects in the system. Each VDisk corresponds to a virtual address space forming the individual bytes exposed as a disk to user VMs. Thus, if the VDisk is of size 1 TB, the corresponding address space maintained by the invention is 1 TB. This address space is broken up into equal sized units called VDisk blocks. The Metadata is used to track and maintain the contents of the VDisks and VDisk blocks.

In maintaining vDisks for the virtualized storage management system, snapshots of a given vDisk may be periodically taken. Whenever a snapshot is taken for a vDisk, a number of steps occur atomically. These steps include: 1) providing the snapshot of the vDisk a name and a version number, 2) marking the snapshot immutable, and 3) making the live vDisk a child of the snapshot.

Metadata for each vDisk is maintained in order to allow for the physical data associated with the vDisk to be located. Such metadata is maintained in a mapping structure known as a vDisk Block Map. The vDisk Block map includes metadata for each block of a given vDisk, and metadata is kept for each snapshot of a given vDisk. For a given snapshot of a vDisk, only metadata related to blocks of the vDisk that have been modified (e.g., by a write operation) since the preceding snapshot (e.g., parent snapshot) of the vDisk are maintained in the vDisk Block map for that snapshot. Similarly, for the live vDisk, only metadata related to blocks of the vDisk that have been modified since the latest snapshot are maintained in the vDisk Block map. Said otherwise, if a vDisk block for a given snapshot hasn't changed since the preceding snapshot was taken, then no metadata for that vDisk block of the given snapshot is maintained.

Figure 3A:
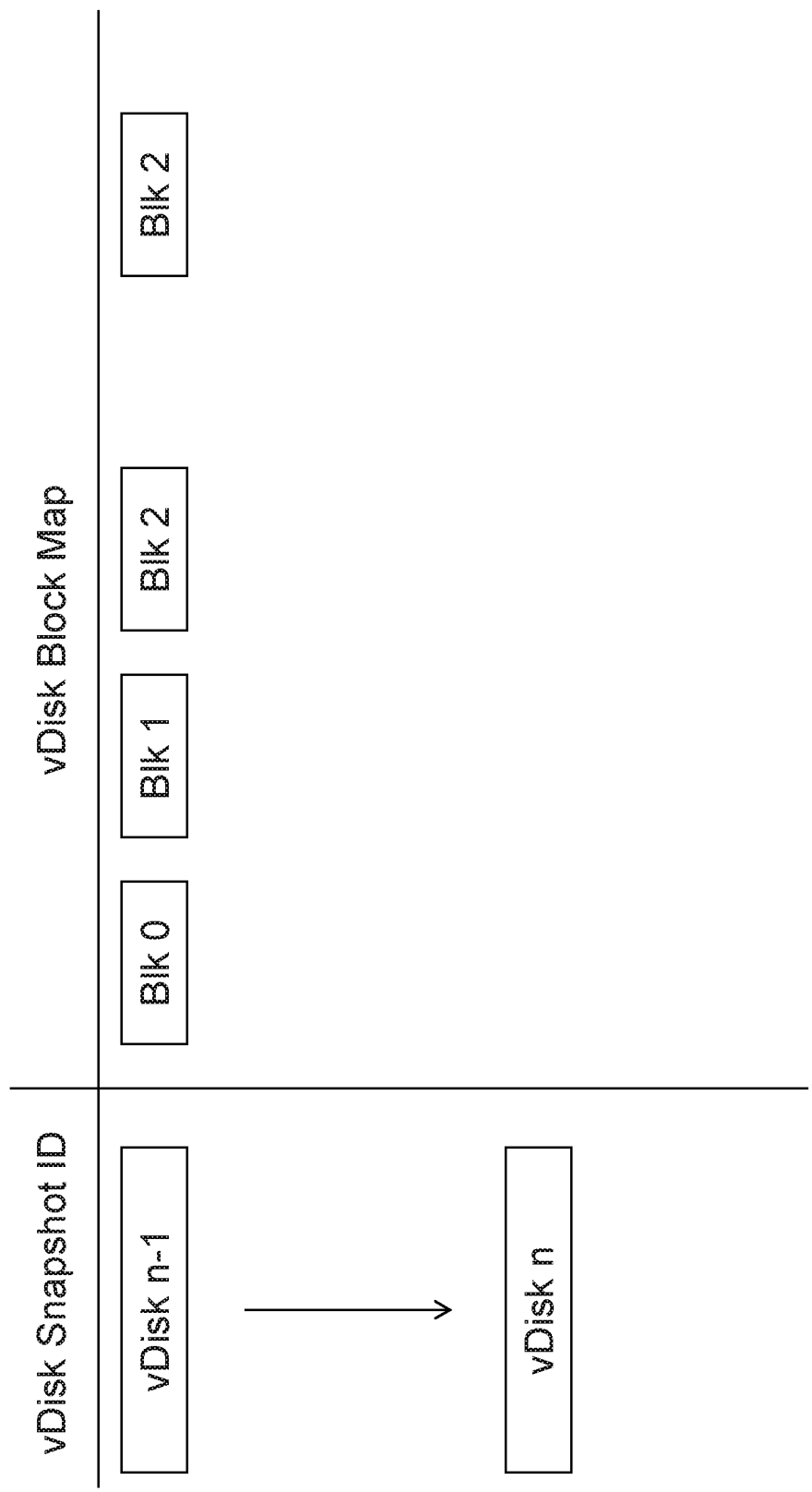
FIGS. 3A-3C are schematic diagrams illustrating the maintenance of metadata for snapshots of a vDisk using a vDisk Block Map.
Figure 3B:
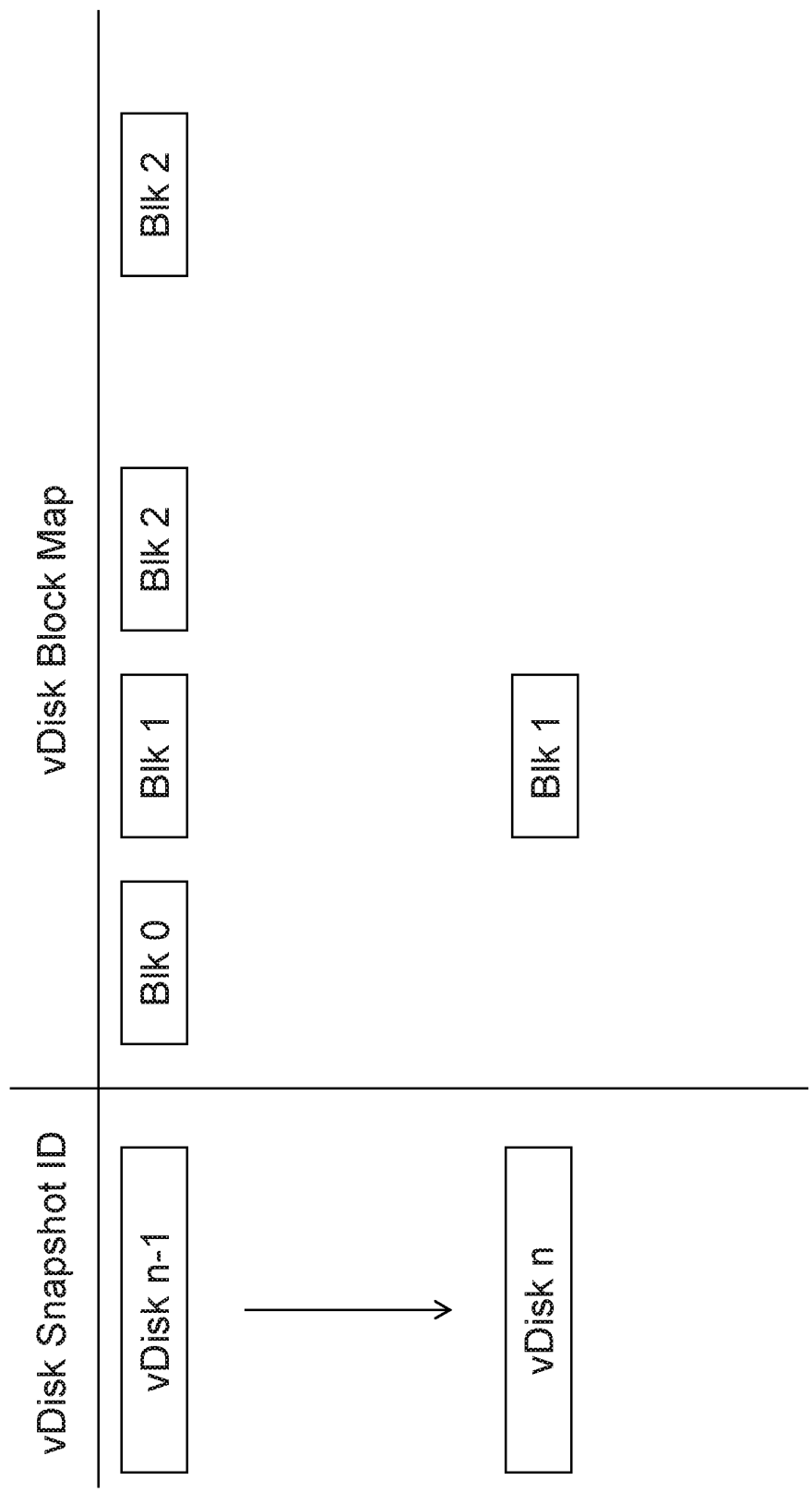
Figure 3C:
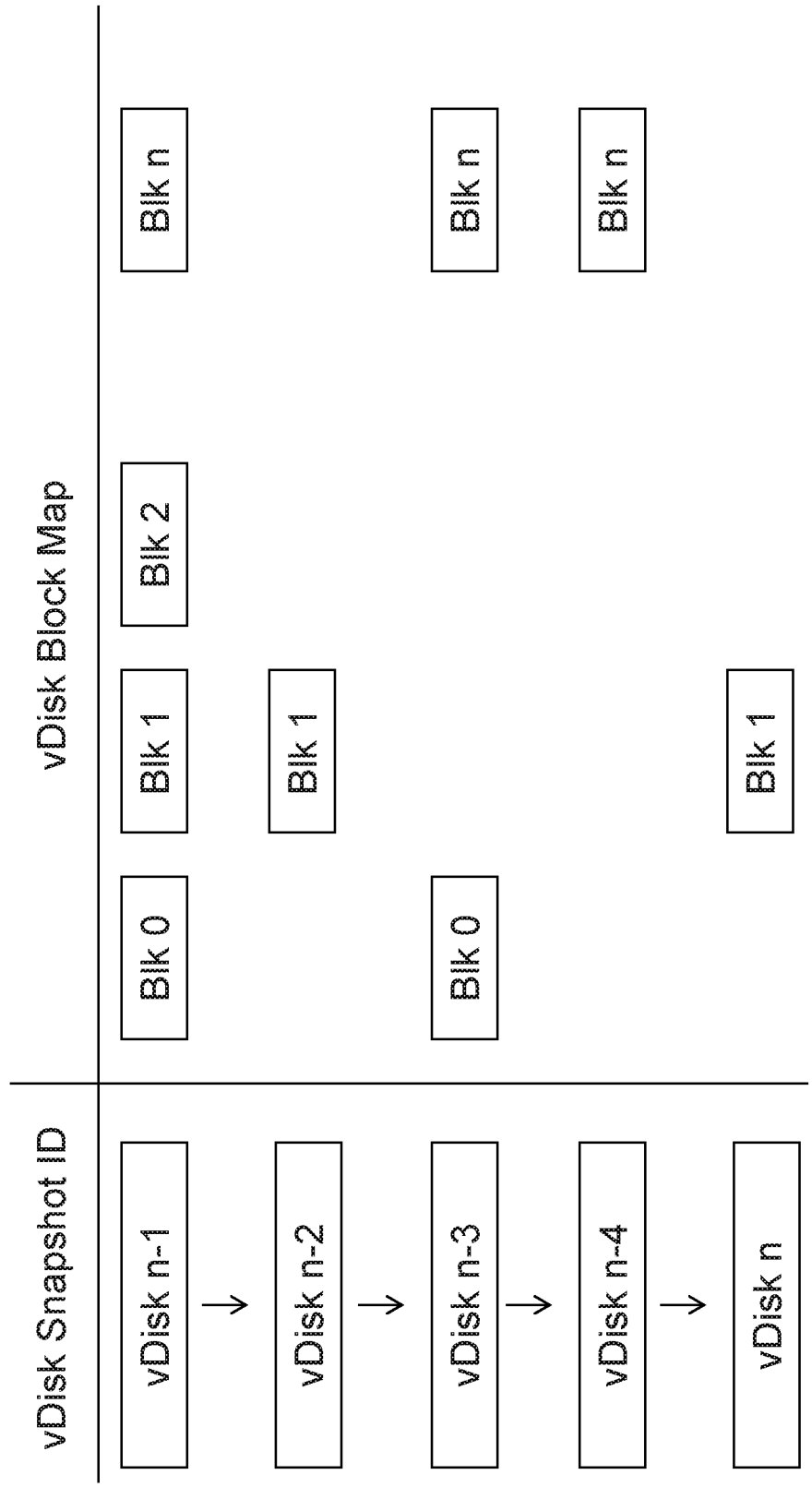

FIGS. 3A-3C are schematic diagrams illustrating the maintenance of metadata for snapshots of a vDisk using a vDisk Block Map. FIG. 3A is a schematic diagram illustrating the process of generating a snapshot for a vDisk.

In FIG. 3A, a snapshot of a vDisk, identified as vDisk n is taken. When the snapshot is taken, the snapshot is provided with a name and a version number. The name of the snapshot may be the name of the vDisk from which the snapshot is generated, or any other indication of the vDisk from which the snapshot is generated. The version number may be any indication of when the snapshot was taken. For example, the version number may be a sequence number or may be a timestamp. For purposes of example, the snapshot in FIG. 3A will be identified by the name of the vDisk from which the snapshot is generated (e.g., vDisk n) and also a sequence number (e.g., 1).

For purposes of illustration, the snapshot vDisk n-1 will be the first snapshot of vDisk n. When the snapshot vDisk n-1 is generated, the snapshot is marked immutable and no modifications are allowed to be made on the snapshot vDisk n-1. Additionally, at the time the snapshot vDisk n-1 is generated, the live vDisk n is made a child of the snapshot. All requests to modify (e.g., write) the vDisk n will be directed at the live vDisk and not at any of the snapshots.

A mapping structure, known as a vDisk Block Map, is utilized to maintain metadata associated with the vDisk. In some embodiments, metadata may be maintained for each block of the vDisk. Whenever a snapshot is generated for a vDisk, metadata related to blocks of the vDisk that have been modified (e.g., by a write operation) since the preceding snapshot (e.g., parent snapshot) of the vDisk are maintained in the vDisk Block Map for that snapshot. Here snapshot vDisk n-1 is the first snapshot generated for vDisk n, and so metadata for all blocks of vDisk n are maintained in the vDisk Block Map for snapshot vDisk n-1.

Metadata for a vDisk block may include such information as map entries that identify the extent at which to locate physical data for the vDisk block. Metadata may also include SHA1 fingerprints where deduplication is used.

Once the snapshot vDisk n-1 has been generated, all write requests for the vDisk are directed at the live vDisk n, which is a child of the snapshot vDisk n-1. FIG. 3B is a schematic diagram illustrating the process of updating the vDisk Block Map in response to a write request directed at the live vDisk. In FIG. 3B, a write request directed at a block in the vDisk n associated with extent 1 is made. In response to fulfilling the write request, the vDisk Block map is updated to include metadata for the block of vDisk n at which the write request was directed.

Only metadata related to blocks of the live vDisk that have been modified (e.g., by a write operation) since the preceding snapshot (e.g., parent snapshot) of the vDisk are maintained in the vDisk Block Map for the live vDisk n. Metadata related to blocks of the live vDisk n that have not been modified since the preceding snapshot of the vDisk are not maintained in the vDisk Block Map for the live vDisk n.

Figure 4:
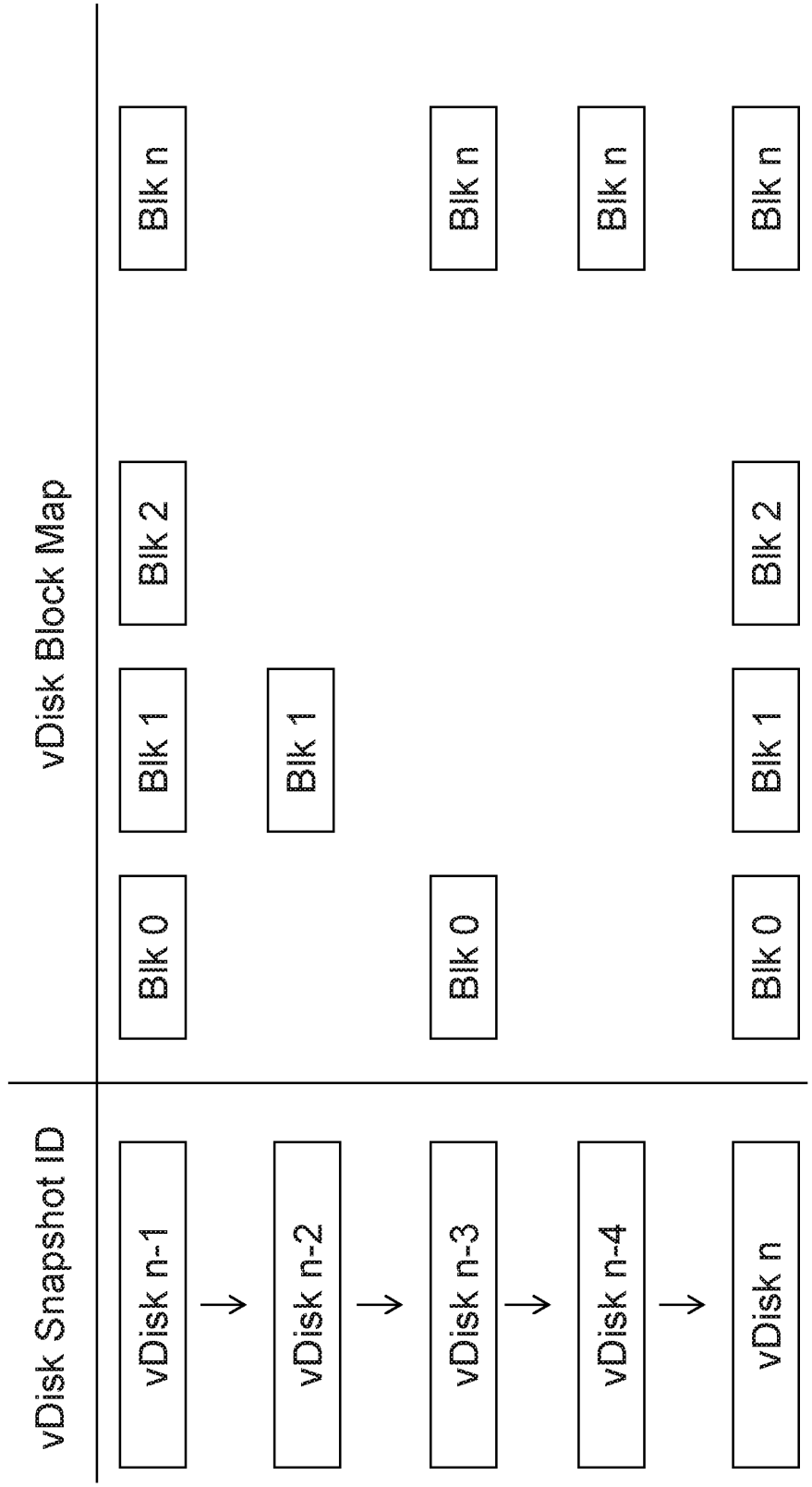
FIG. 4 is a schematic diagram illustrating the approach for copying metadata from parent snapshots to child snapshots.

Over time, several snapshots at different points in time may be taken for a given vDisk. FIG. 3C is a schematic diagram illustrating a snapshot chain and its corresponding vDisk Block Map. In FIG. 3C, 4 snapshots, namely snapshots vDisk n-1, n-2, n-3 and n-4 have been taken to create a linear chain of snapshots. For each snapshot, only metadata related to blocks of the snapshot that have been modified (e.g., by a write operation) since the preceding snapshot (e.g., parent snapshot) are maintained in the vDisk Block Map for that snapshot. Metadata related to blocks of the snapshot that have not been modified since the preceding snapshot is not maintained in the vDisk Block Map for that snapshot.

Similarly, for the live vDisk n, only metadata related to blocks of the live vDisk that have been modified (e.g., by a write operation) since the preceding snapshot (e.g., parent snapshot) for the vDisk are maintained in the vDisk Block Map for the live vDisk. Metadata related to blocks of the live vDisk that have not been modified since the preceding snapshot are not maintained in the vDisk Block Map for the live vDisk.

Thus, snapshot vDisk n-1 includes metadata for blocks 0-n, snapshot vDisk n-2 includes metadata for only block 1, snapshot vDisk n-3 includes metadata for only blocks 0 and n, snapshot vDisk n-4 includes metadata for only block n, and live vDisk n includes metadata for only block 1.

The absence of metadata for a vDisk block of a given snapshot or live vDisk implies that a corresponding parent snapshot must be traversed in order to obtain that metadata for the vDisk block. As more and more snapshots of a vDisk are taken, and the snapshot chain/tree grows deeper, the ability to efficiently perform read operations on the vDisk using the vDisk Block Map substantially declines. For example, obtaining metadata for a given vDisk block to fulfill a read request may require traversing several levels of the vDisk Block Map.

One approach for mitigating the read performance of vDisks, involves performing an operation which copies over metadata from parent snapshots to child snapshots or from parent snapshots to the live vDisk, such that all metadata for blocks of a vDisk may be available for a given snapshot or for the live vDisk.

FIG. 4 is a schematic diagram illustrating the approach for copying metadata from parent snapshots to child snapshots. In FIG. 4, a copy operation, referred to herein as Copy-BlockMap, is performed to copy metadata associated with parent snapshots of the vDisk n to the vDisk Block Map entry for the live vDisk n. After the CopyBlockMap operation has been fulfilled, the vDisk Block Map entry for the live vDisk n will include metadata for all blocks of the vDisk.

Although a CopyBlock Map operation allows for metadata associated with parent snapshots of a vDisk n to be copied over to a vDisk Block Map entry for a child snapshot or live vDisk, making copies of metadata causes unnecessary metadata bloating due to the duplication of redundant information. Such bloating wastes physical storage space (e.g., SSD space) and also reduces cache capacity for effectively holding the metadata.

Rather than performing a CopyBlock Map operation in order to update metadata in the vDisk Block Map for blocks of a vDisk snapshot or live vDisk missing metadata, an efficient mapping structure may be lazily generated and utilized to maintain metadata for snapshots in a virtualized storage environment. Whenever a snapshot is taken of a vDisk, a background process may be utilized to lazily populate the mapping structure, which will be described in greater detail below.

In some embodiments, the mapping structure may be a bit map. The bit map utilized to maintain metadata for snapshots in the virtualized storage environment will be referred to herein as a vDisk Block Bitmap. The vDisk Block Bitmap will include an entry (e.g., row) for each vDisk snapshot as well as an entry (e.g., row) for the live vDisk. Each entry will include several columns corresponding to the blocks for that entry. For example, a vDisk snapshot having 10 different blocks will have 10 different columns, each column corresponding to a different block for the vDisk snapshot.

For each entry (e.g., snapshot or live vDisk) in the vDisk Block Bitmap, a bit will be associated with each block of that entry. The bit will indicate whether the vDisk Block Map has metadata for that block. In some embodiments, an on-bit will be used to represent the presence of a corresponding entry in the vDisk Block Map and an off-bit will be used to represent the absence of a corresponding entry in the vDisk Block Map. Alternatively, in some other embodiments, an off-bit will be used to represent the presence of a corresponding entry in the vDisk Block Map and an on-bit will be used to represent the absence of a corresponding entry in the vDisk Block Map.

Whenever an I/O operation is requested to be performed on a vDisk, the vDisk Block Bitmap may be consulted to quickly identify which snapshots in the vDiskBlock Map contain the needed metadata. This overcomes the inefficiencies of having to traverse several levels of the vDisk Block Map in order to obtain the needed metadata and also eliminates the metadata bloat associated with having to perform a CopyBlockMap operation.

Additionally, the vDisk Block Bitmap may be generated lazily, such that it does not waste valuable computational resources or cause significant system inefficiencies. The vDisk Block Bitmap may also be partitioned such that only recently used or particularly relevant portions of the vDisk Block Bitmap are loaded into the cache, while unused or less relevant portions of the vDisk Block Bitmap may be persistently stored elsewhere.

In some other embodiments, the mapping structure may be a variation of the vDisk Block Bitmap. The variant the vDisk Block Bitmap utilized to maintain metadata for snapshots in the virtualized storage environment will be referred to herein as a vDisk Block Reference Map. The vDisk Block Reference Map will include an entry (e.g., row) for each vDisk snapshot as well as an entry (e.g., row) for the live vDisk. Each entry will include several columns corresponding to the blocks for that entry. For example, a vDisk snapshot having 10 different blocks will have 10 different columns, each column corresponding to a different bock for the vDisk snapshot.

For each entry (e.g., snapshot or live vDisk) in the vDisk Block Reference Map, an ID of the parent snapshot that includes the needed metadata will be associated with each block of that entry. Where no metadata for a block of an entry in the vDisk Block Reference Map exists, a 0 value will be stored.

Whenever an I/O operation is requested to be performed on a vDisk, the vDisk Block Reference Map may be consulted to quickly identify which snapshots in the vDiskBlock Map contain the needed metadata. This overcomes the inefficiencies of having to traverse several levels of the vDisk Block Map in order to obtain the needed metadata and also eliminates the metadata bloat associated with having to perform a CopyBlockMap operation.

Additionally, the vDisk Block Reference Map may be generated lazily, such that it does not waste valuable computational resources or cause significant system inefficiencies. The vDisk Block Reference Map may also be partitioned such that only recently used or particularly relevant portions of the vDisk Block Reference Map are loaded into the cache, while unused or less relevant portions of the vDisk Block Reference Map may be persistently stored elsewhere.

Figure 5:
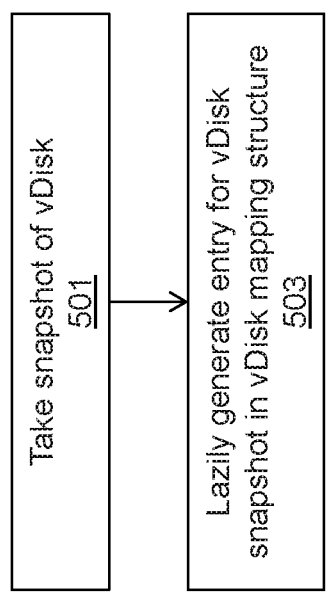
FIG. 5 is a flow diagram illustrating a method for generating the efficient mapping structure for maintaining metadata for snapshots in a virtualized storage environment.

FIG. 5 is a flow diagram illustrating a method for generating the efficient mapping structure for maintaining metadata for snapshots in a virtualized storage environment. Initially, a snapshot is taken of a vDisk as shown at 501. When a snapshot is taken of the vDisk, the snapshot of the vDisk is provided a name and a version number, the snapshot is marked immutable, and the live vDisk is made a child of the snapshot. At the time the snapshot is taken, an entry may be created for that snapshot in the vDisk Block Map. The entry in the vDisk Block Map corresponding to the snapshot is populated with metadata related to blocks of the vDisk that have been modified (e.g., by a write operation) since the preceding snapshot (e.g., parent snapshot).

An entry corresponding to that snapshot is then lazily generated in a mapping structure (e.g., vDisk Block Bitmap or vDisk Block Reference Map) as shown at 503. A background process may be utilized to lazily populate the mapping structure, such that creation of entries in the mapping structure does not waste valuable computational resources or cause significant system inefficiencies. Each entry will include several columns corresponding to the blocks for that entry.

Where an entry is generated in the vDisk Block Bitmap for that snapshot, a bit will be associated with each block of that entry. The bit will indicate whether the corresponding entry in the vDisk Block Map has metadata for that block. In some embodiments, an on-bit will be used to represent the presence of a corresponding entry in the vDisk Block Map and an off-bit will be used to represent the absence of a corresponding entry in the vDisk Block Map. Alternatively, in some other embodiments, an off-bit will be used to represent the presence of a corresponding entry in the vDisk Block Map and an on-bit will be used to represent the absence of a corresponding entry in the vDisk Block Map.

Whenever an I/O operation is requested to be performed on a vDisk, the vDisk Block Bitmap may be consulted to quickly identify which snapshots in the vDiskBlock Map contain the needed metadata, which will be discussed in greater detail below.

Where an entry is generated in the vDisk Block Reference Map for that snapshot, an ID of the nearest ancestor snapshot (e.g., parent snapshot) that includes the needed metadata will be associated with each block of that entry. Where the corresponding snapshot itself includes the needed metadata for a block, a 1 bit will be associated with the block for that entry. Where no metadata for a block of an entry in the vDisk Block Reference Map exists, a 0 value will be stored.

Whenever an I/O operation is requested to be performed on a vDisk, the vDisk Block Reference Map may be consulted to quickly identify which snapshots in the vDiskBlock Map contain the needed metadata, which will be discussed in greater detail below.

Figure 6:
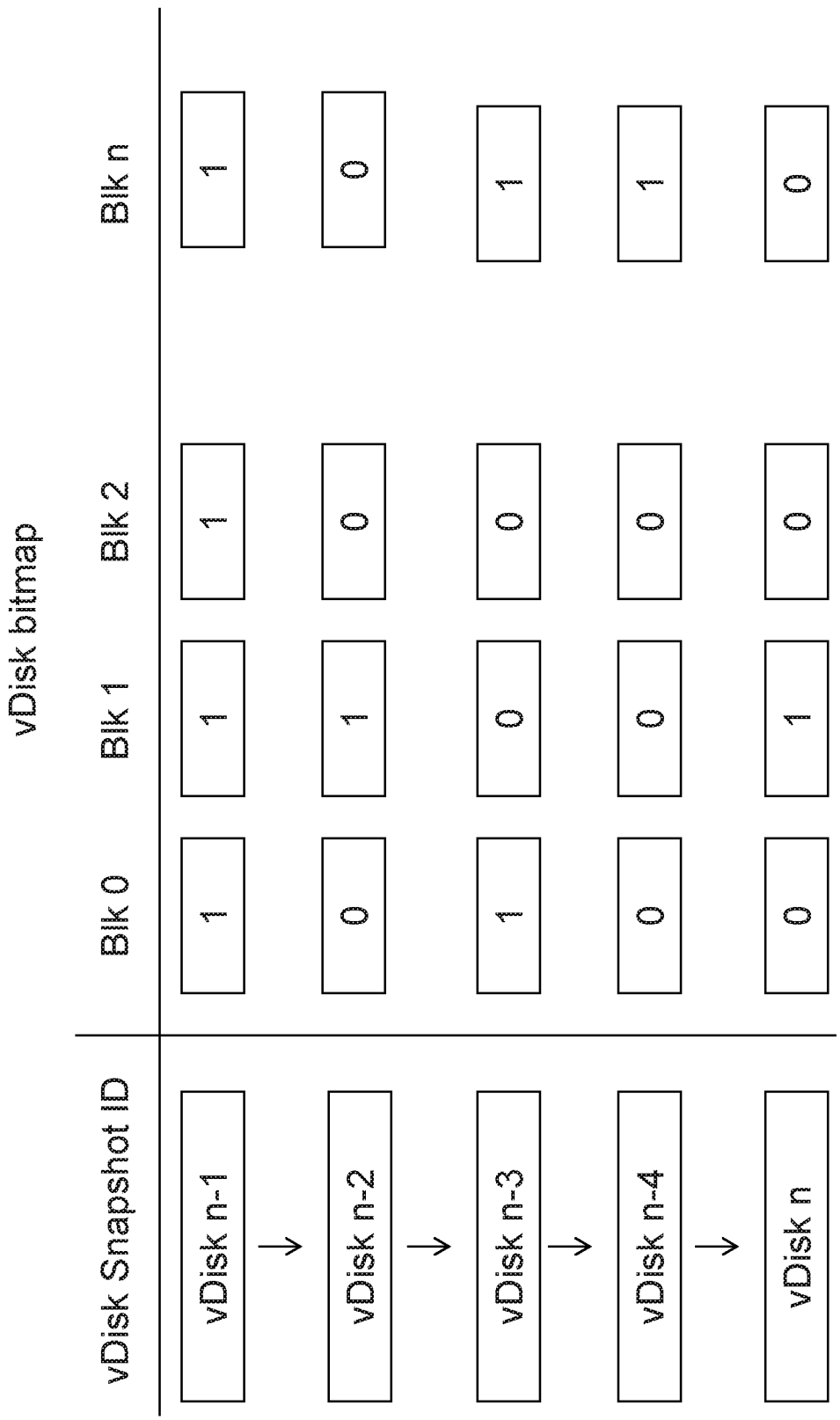
FIG. 6 is a schematic diagram illustrating the maintenance of metadata for snapshots of a vDisk using a vDisk Block Bitmap according to some embodiments of the invention.

FIG. 6 is a schematic diagram illustrating the maintenance of metadata for snapshots of a vDisk using a vDisk Block Bitmap according to some embodiments of the invention. Over time, several snapshots at different points in time may be taken for a given vDisk. The left hand portion of FIG. 6 illustrates a snapshot chain and the right hand portion of FIG. 6 illustrates the corresponding vDisk Block Bitmap.

In FIG. 6, 4 snapshots, namely snapshots vDisk n-1, n-2, n-3 and n-4 have been taken to create a linear chain of snapshots. For each snapshot, only metadata related to blocks of the snapshot that have been modified (e.g., by a write operation) since the preceding snapshot (e.g., parent snapshot) are maintained in the vDisk Block Map (not shown) for that snapshot. Metadata related to blocks of the snapshot that have not been modified since the preceding snapshot is not maintained in the vDisk Block Map (not shown) for that snapshot.

The vDisk Block Bitmap includes an entry (e.g., row) for each vDisk snapshot as well as an entry (e.g., row) for the live vDisk. Thus the vDisk Block Bitmap includes entries for snapshots vDisk n-1, n-2, n-3 and n-4 as well as an entry for live vDisk n. Each entry will include several columns corresponding to the blocks for that entry. Here, each vDisk snapshot and the live vDisk include n blocks, and so each entry includes n columns.

For each entry (e.g., snapshot or live vDisk) in the vDisk Block Bitmap, a bit will be associated with each block of that entry. The bit will indicate whether the corresponding entry in the vDisk Block Map has metadata for that block. In FIG. 6, an on-bit will be used to represent the presence of a corresponding entry in the vDisk Block Map and an off-bit will be used to represent the absence of a corresponding entry in the vDisk Block Map.

The vDisk Block Map corresponding to the vDisk Block Bitmap of FIG. 6, will be the vDisk Block Map illustrated in FIG. 3C. As illustrated in FIG. 3C, the entry in the vDisk Block Map corresponding to snapshot vDisk n-1, includes metadata for every block. Accordingly, the vDisk Block Bitmap entry for snapshot vDisk n-1 indicates that the corresponding entry in the vDisk Block Map has metadata for every block 1-$n$. This is indicated by the presence of the on-bit for every block of snapshot vDisk n-1.

Also, as illustrated in FIG. 3C, the entry in the vDisk Block Map corresponding to snapshot vDisk n-2, includes metadata for only block 1. Accordingly, the vDisk Block Bitmap entry for snapshot vDisk n-2 indicates that the corresponding entry in the vDisk Block Map has metadata for only block 1. This is indicated by the presence of the on-bit for only block 1 of snapshot vDisk n-2 and the presence of the off-bit for every other block of snapshot vDisk n-2.

Also, as illustrated in FIG. 3C, the entry in the vDisk Block Map corresponding to snapshot vDisk n-3, includes metadata for only blocks 0 and n. Accordingly, the vDisk Block Bitmap entry for snapshot vDisk n-3 indicates that the corresponding entry in the vDisk Block Map has metadata for only blocks 0 and n. This is indicated by the presence of the on-bit for only blocks 0 and n of snapshot vDisk n-3 and the presence of the off-bit for every other block of snapshot vDisk n-3.

Also, as illustrated in FIG. 3C, the entry in the vDisk Block Map corresponding to snapshot vDisk n-4, includes metadata for only block n. Accordingly, the vDisk Block Bitmap entry for snapshot vDisk n-4 indicates that the corresponding entry in the vDisk Block Map has metadata for only block n. This is indicated by the presence of the on-bit for only block n of snapshot vDisk n-4 and the presence of the off-bit for every other block of snapshot vDisk n-4.

Also, as illustrated in FIG. 3C, the entry in the vDisk Block Map corresponding to live vDisk n, includes metadata for only block 1. Accordingly, the vDisk Block Bitmap entry for live vDisk n indicates that the corresponding entry in the vDisk Block Map has metadata for only block 1. This is indicated by the presence of the on-bit for only block 1 of live vDisk n and the presence of the off-bit for every other block of live vDisk n.

Whenever an I/O operation is requested to be performed on a vDisk, the vDisk Block Bitmap may be consulted to quickly identify which snapshots in the vDiskBlock Map contain the needed metadata. This overcomes the inefficiencies of having to traverse several levels of the vDisk Block Map in order to obtain the needed metadata and also eliminates the metadata bloat associated with having to perform a CopyBlockMap operation. Even where several levels of the vDisk Block Bitmap need to be consulted to identify where metadata can be found, such traversal may be performed much more efficiently due to the compactness of bitmaps in comparison to the vDisk Block Map.

Figure 7:
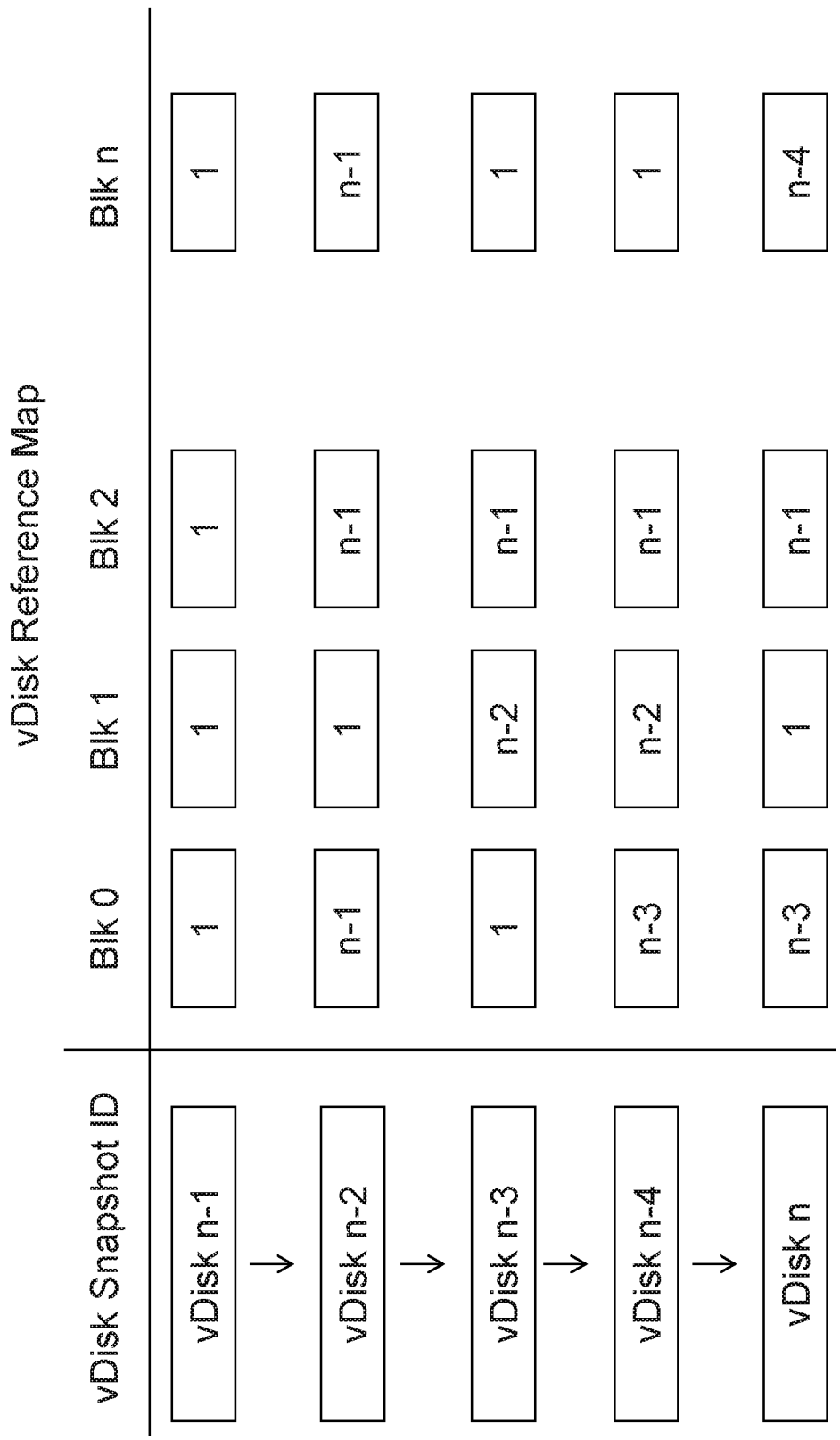
FIG. 7 is a schematic diagram illustrating the maintenance of metadata for snapshots of a vDisk using a vDisk Block Reference Map according to some embodiments of the invention.

FIG. 7 is a schematic diagram illustrating the maintenance of metadata for snapshots of a vDisk using a vDisk Block Reference Map according to some embodiments of the invention. Over time, several snapshots at different points in time may be taken for a given vDisk. The left hand portion of FIG. 7 illustrates a snapshot chain and the right hand portion of FIG. 7 illustrates the corresponding vDisk Block Reference Map.

In FIG. 7, 4 snapshots, namely snapshots vDisk n-1, n-2, n-3 and n-4 have been taken to create a linear chain of snapshots. For each snapshot, only metadata related to blocks of the snapshot that have been modified (e.g., by a write operation) since the preceding snapshot (e.g., parent snapshot) are maintained in the vDisk Block Map (not shown) for that snapshot. Metadata related to blocks of the snapshot that have not been modified since the preceding snapshot is not maintained in the vDisk Block Map (not shown) for that snapshot.

The vDisk Block Reference map includes an entry (e.g., row) for each vDisk snapshot as well as an entry (e.g., row) for the live vDisk. Thus the vDisk Reference map includes entries for snapshots vDisk n-1, n-2, n-3 and n-4 as well as an entry for live vDisk n. Each entry will include several columns corresponding to the blocks for that entry. Here, each vDisk snapshot and the live vDisk include n blocks, and so each entry includes n columns.

For each entry (e.g., snapshot or live vDisk) in the vDisk Block Reference map, a value will be associated with each block of that entry. The value will indicate which entry in the vDisk Block Map has metadata for that block. The value includes an ID of the nearest ancestor snapshot (e.g., parent snapshot) that has the needed metadata for the block of that entry. Where the corresponding snapshot itself includes the needed metadata for a block, a 1 bit will be associated with the block for that entry. Where no metadata for a block of an entry in the vDisk Block Reference Map exists, a 0 value will be stored.

The vDisk Block Map corresponding to the vDisk Block Reference map of FIG. 7, will be the vDisk Block Map illustrated in FIG. 3C. As illustrated in FIG. 3C, the entry in the vDisk Block Map corresponding to snapshot vDisk n-1, includes metadata for every block. Accordingly, the vDisk Block Reference map entry for snapshot vDisk n-1 indicates that the corresponding entry in the vDisk Block Map has metadata for every block 1-n. This is indicated by the presence of a 1 bit for every block of snapshot vDisk n-1.

Also, as illustrated in FIG. 3C, the entry in the vDisk Block Map corresponding to snapshot vDisk n-2, includes metadata for only block 1. Accordingly, the vDisk Block Reference map entry for snapshot vDisk n-2 indicates that the corresponding entry in the vDisk Block Map has metadata for only block 1. This is indicated by the presence of a 1 bit for only block 1 of snapshot vDisk n-2.

For the other blocks of snapshot vDisk n-2, the nearest ancestor snapshot that includes metadata for those blocks is snapshot vDisk n-1, as illustrated in FIG. 3C. Accordingly, the vDisk Block Reference map entry for snapshot vDisk n-2 includes a value for blocks 0, 2 and n that identifies snapshot vDisk n-1 as the closest ancestor snapshot where metadata can be found for those blocks.

Also, as illustrated in FIG. 3C, the entry in the vDisk Block Map corresponding to snapshot vDisk n-3, includes metadata for only blocks 0 and n. Accordingly, the vDisk Block Reference map entry for snapshot vDisk n-3 indicates that the corresponding entry in the vDisk Block Map has metadata for only blocks 0 and n. This is indicated by the presence of a 1 bit for only blocks 0 and n of snapshot vDisk n-3.

For block 1 of snapshot vDisk n-3, the nearest ancestor snapshot that includes metadata for that block is snapshot vDisk n-2, as illustrated in FIG. 3C. Accordingly, the vDisk Block Reference map entry for snapshot vDisk n-2 includes a value for block 1 that identifies snapshot vDisk n-2 as the closest ancestor snapshot where metadata can be found for those blocks.

Similarly, for block 2 of snapshot vDisk n-3, the nearest ancestor snapshot that includes metadata for that block is snapshot vDisk n-1, as illustrated in FIG. 3C. Accordingly, the vDisk Block Reference map entry for snapshot vDisk n-3 includes a value for block 2 that identifies snapshot vDisk n-1 as the closest ancestor snapshot where metadata can be found for those blocks.

Also, as illustrated in FIG. 3C, the entry in the vDisk Block Map corresponding to snapshot vDisk n-4, includes metadata for only block n. Accordingly, the vDisk Block Reference map entry for snapshot vDisk n-4 indicates that the corresponding entry in the vDisk Block Map has metadata for only block n. This is indicated by the presence of a 1 bit for only block n of snapshot vDisk n-4.

For block 0 of snapshot vDisk n-4, the nearest ancestor snapshot that includes metadata for that block is snapshot vDisk n-3, as illustrated in FIG. 3C. Accordingly, the vDisk Block Reference map entry for snapshot vDisk n-4 includes a value for block 0 that identifies snapshot vDisk n-3 as the closest ancestor snapshot where metadata can be found for those blocks.

Similarly, for block 1 of snapshot vDisk n-4, the nearest ancestor snapshot that includes metadata for that block is snapshot vDisk n-2, as illustrated in FIG. 3C. Accordingly, the vDisk Block Reference map entry for snapshot vDisk n-4 includes a value for block 1 that identifies snapshot vDisk n-2 as the closest ancestor snapshot where metadata can be found for those blocks.

Likewise, for block 2 of snapshot vDisk n-4, the nearest ancestor snapshot that includes metadata for that block is snapshot vDisk n-1, as illustrated in FIG. 3C. Accordingly, the vDisk Block Reference map entry for snapshot vDisk n-4 includes a value for block 2 that identifies snapshot vDisk n-1 as the closest ancestor snapshot where metadata can be found for those blocks.

Also, as illustrated in FIG. 3C, the entry in the vDisk Block Map corresponding to live vDisk n, includes metadata for only block 1. Accordingly, the vDisk Block Reference map entry for live vDisk n indicates that the corresponding entry in the vDisk Block Map has metadata for only block 1. This is indicated by the presence of a 1 bit for only block 1 of live vDisk n.

For block 0 of live vDisk n, the nearest ancestor snapshot that includes metadata for that block is snapshot vDisk n-3, as illustrated in FIG. 3C. Accordingly, the vDisk Block Reference map entry for live vDisk n includes a value for block 0 that identifies snapshot vDisk n-3 as the closest ancestor snapshot where metadata can be found for those blocks.

Similarly, for block 2 of live vDisk n-4, the nearest ancestor snapshot that includes metadata for that block is snapshot vDisk n-1, as illustrated in FIG. 3C. Accordingly, the vDisk Block Reference map entry for live vDisk n includes a value for block 2 that identifies snapshot vDisk n-1 as the closest ancestor snapshot where metadata can be found for those blocks.

Likewise, for block n of live vDisk n, the nearest ancestor snapshot that includes metadata for that block is snapshot vDisk n-4, as illustrated in FIG. 3C. Accordingly, the vDisk Block Reference map entry for live vDisk n includes a value for block n that identifies snapshot vDisk n-4 as the closest ancestor snapshot where metadata can be found for those blocks.

Whenever an I/O operation is requested to be performed on a vDisk, the vDisk Block Reference map may be consulted to quickly identify which snapshots in the vDiskBlock Map contain the needed metadata. This overcomes the inefficiencies of having to traverse several levels of the vDisk Block Map in order to obtain the needed metadata and also eliminates the metadata bloat associated with having to perform a CopyBlockMap operation. This also eliminates the need to traverse several levels of the vDisk Block Reference map to identify where metadata can be found, as entries in the vDisk Block Reference map include entries having values that identify the nearest ancestor snapshot where metadata for a block can be found.

Figure 8:
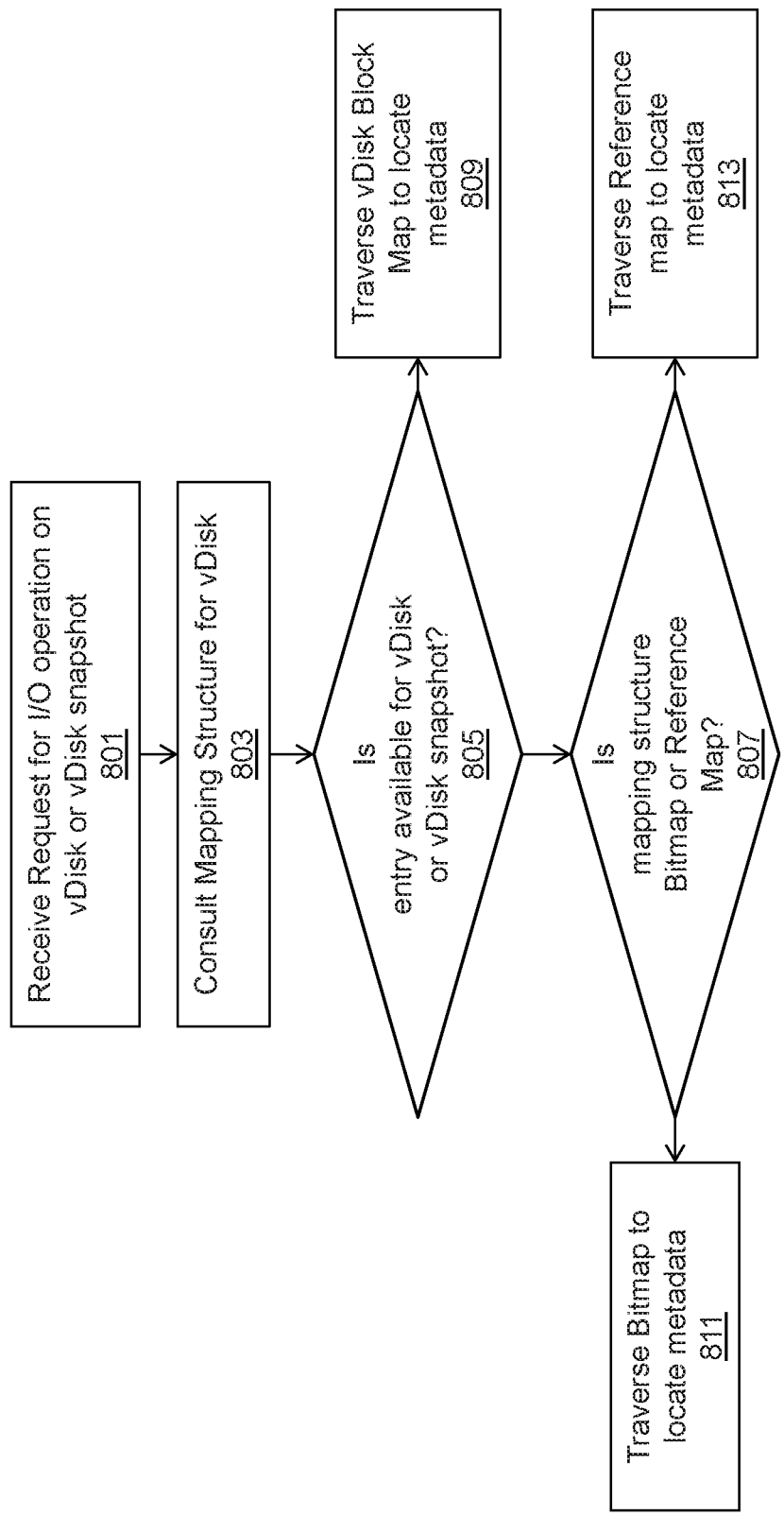
FIG. 8 is a flow diagram illustrating a method of obtaining metadata for a vDisk in a virtualized storage environment using an efficient mapping structure according to some embodiments of the invention.

FIG. 8 is a flow diagram illustrating a method of obtaining metadata for a vDisk in a virtualized storage environment using an efficient mapping structure according to some embodiments of the invention.

Initially, a request for performing an I/O operation on a vDisk or vDisk snapshot as shown at 801. The request may be a read operation or a write operation, and the request may be directed at either a live vDisk or a vDisk snapshot.

When the I/O operation is received, the mapping structure is consulted as shown at 803. In some embodiments, the mapping structure may be a vDisk Block Bitmap, as described above. In other embodiments, the mapping structure may be a vDisk Block Reference map, also described above. The mapping structure is consulted before the vDisk Block Map is consulted, because the mapping structure is configured to very quickly and efficiently identify which entries in the vDisk Block Map contain the needed metadata for fulfilling the I/O operation. In contrast, directly consulting the vDisk Block Map may require traversing several levels of entries before locating the necessary metadata for fulfilling the I/O request.

Because entries in the mapping structure (e.g., vDisk Block Bitmap or vDisk Block Reference Map) are lazily generated by a background process, there may be situations where an entry in the mapping structure has not yet been created for the target vDisk snapshot or live vDisk. Thus, a determination is first made as to whether an entry corresponding to the target vDisk snapshot or live vDisk is available in the mapping structure as shown at 805.

If the entry has not yet been generated, the vDisk Block Map may be traversed to locate the needed metadata as shown at 809.

If the entry has been generated, then the mapping structure may be utilized to locate the needed metadata. A determination may first be made as to whether the mapping structure is a vDisk Block Bitmap or a vDisk Block Reference map as shown at 807.

Where the mapping structure is a vDisk Block Bitmap, the vDisk Block Bitmaps is traversed to locate the necessary metadata as shown at 811. For a given I/O operation directed at a vDisk snapshot or live vDisk, the corresponding entry in the vDisk Block Bitmap is identified. The corresponding entry in the vDisk Block Bitmap includes a bit that is associated with each block of that entry. The bit will indicate whether the corresponding entry in the vDisk Block Map has metadata for that block. Where the vDisk Block Bitmap indicates that the corresponding entry in the vDisk Block Map has metadata for a given block, then the corresponding entry in the vDisk Block Map is used to obtain the needed metadata. Where the vDisk Block Bitmap indicates that the corresponding entry in the vDisk Block Map does not include metadata for a given block, then the vDisk Block Bitmap is traversed to identify the nearest ancestor snapshot that includes the needed metadata for that block. This is done by moving up the snapshot chain for the vDisk until a snapshot is encountered that has a 1 bit in the vDisk Block Bitmap for that block. The metadata for that block is then obtained by locating the entry in the vDisk Block Map corresponding to that snapshot.

Where the mapping structure is a vDisk Block Reference map, the vDisk Block Reference map is traversed to locate the necessary metadata as shown at 813. For a given I/O operation directed at a vDisk snapshot or live vDisk, the corresponding entry in the vDisk Block Reference map is identified. The corresponding entry in the vDisk Block Reference map includes a value that is associated with each block of that entry. The value will include an ID of the nearest ancestor snapshot (e.g., parent snapshot) that includes the needed metadata for that block. Where the corresponding snapshot itself includes the needed metadata for a block, a 1 bit will be associated with the block for that entry. Where no metadata for a block of an entry in the vDisk Block Reference Map exists, a 0 value will be stored. Where the vDisk Block Reference map indicates that the corresponding entry in the vDisk Block Map has metadata for a given block, then the corresponding entry in the vDisk Block Map is used to obtain the needed metadata. Where the vDisk Block Bitmap indicates that an ancestor entry in the vDisk Block Map includes metadata for a given block, then the corresponding ancestor entry in the vDisk Block Map is used to obtain the needed metadata. This is done by simply identifying the ID of the nearest ancestor snapshot that includes the needed metadata for that block in the vDisk Block Reference map and locating its corresponding entry in the vDisk Block Map.

Utilizing vDisk Block Bitmaps or vDisk Block Reference maps overcomes the inefficiencies of having to traverse several levels of the vDisk Block Map in order to obtain the needed metadata and also eliminates the metadata bloat associated with having to perform a CopyBlockMap operation. When the vDisk Block Reference map is utilized the need to traverse several levels to identify where metadata can be found is also eliminated, as entries in the vDisk Block Reference map include values that identify the nearest ancestor snapshot where metadata for a block can be found.

Merging and collapsing of vDisk snapshots may also be implemented using the mapping structures (e.g., vDisk Block Bitmap or vDisk Block Reference Map) described above. Merging and collapsing of vDisk snapshots refers to the process of eliminating or deleting snapshots that are no longer used. Whenever vDisk snapshots are merged, their corresponding vDisk Block Map entries and mapping structure (e.g., vD vDisk Block Bitmap or vDisk Block Reference Map) entries must be properly handled to ensure consistency.

Figure 9:
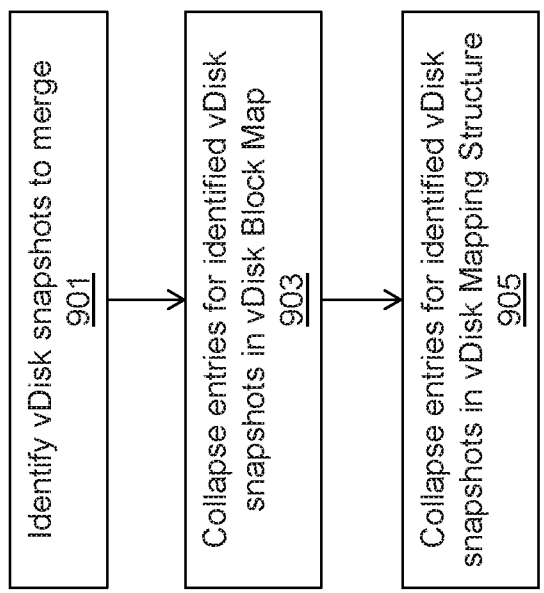
FIG. 9 is a flow diagram illustrating a method for merging vDisk snapshots in accordance with some embodiments.

FIG. 9 is a flow diagram illustrating a method for merging vDisk snapshots in accordance with some embodiments. Initially, vDisk snapshots to be merged are identified, as shown at 901. In some embodiments, a single vDisk snapshot may be merged at a time. In other embodiments, several vDisk snapshots may be merged in a single operation. In some embodiments, the vDisk snapshots to be merged may be consecutive vDisk snapshots in a chain. In other embodiments, the vDisk snapshots to be merged may be non-consecutive vDisk snapshots in a chain.

After the vDisk snapshots to be merged have been identified, entries in the vDisk Block Map corresponding to those identified vDisk snapshots are collapsed as shown at 903.

Collapsing entries in the vDisk Block Map involves transferring metadata for blocks in the entry to be deleted to a nearest child entry that will remain after the merge is complete.

Additionally, after the vDisk snapshots to be merged have been identified, entries in the vDisk Block Mapping Structure (e.g., vDisk Block Bitmap or vDisk Block Reference Map) corresponding to those identified vDisk snapshots are collapsed as shown at 905. Where the mapping structure is a vDisk Block Bitmap, collapsing entries involves transferring bits for blocks in the entry to be deleted to a nearest child entry that will remain after the merge is complete. Where the mapping structure is a vDisk Block Reference map, collapsing entries involves transferring values (e.g., IDs) for blocks in the entry to be deleted to a nearest child entry that will remain after the merge is complete.

Figure 10A:
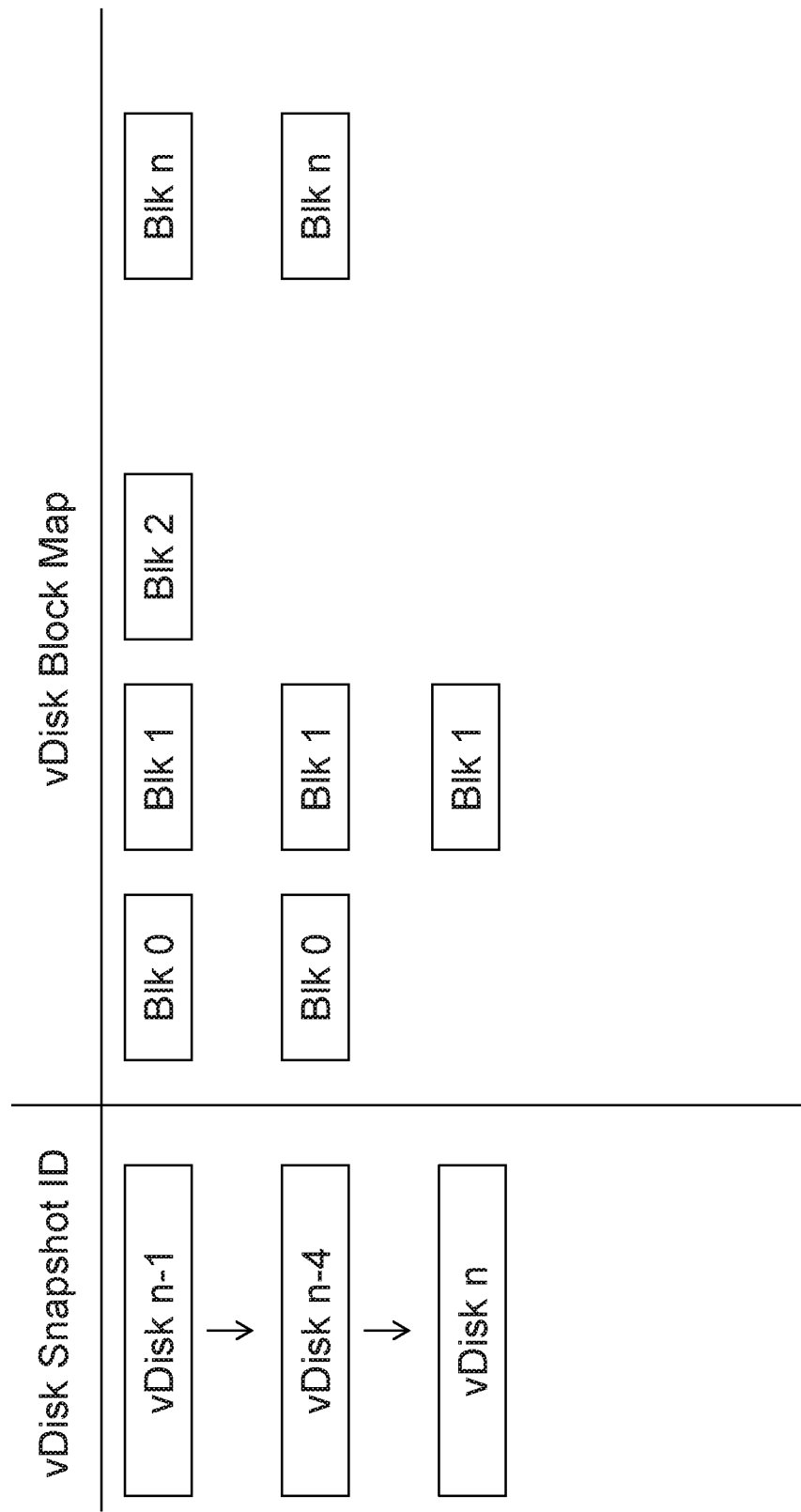
FIGS. 10A-C are schematic diagrams illustrating a method for merging vDisk snapshots in accordance with some embodiments.
Figure 10B:
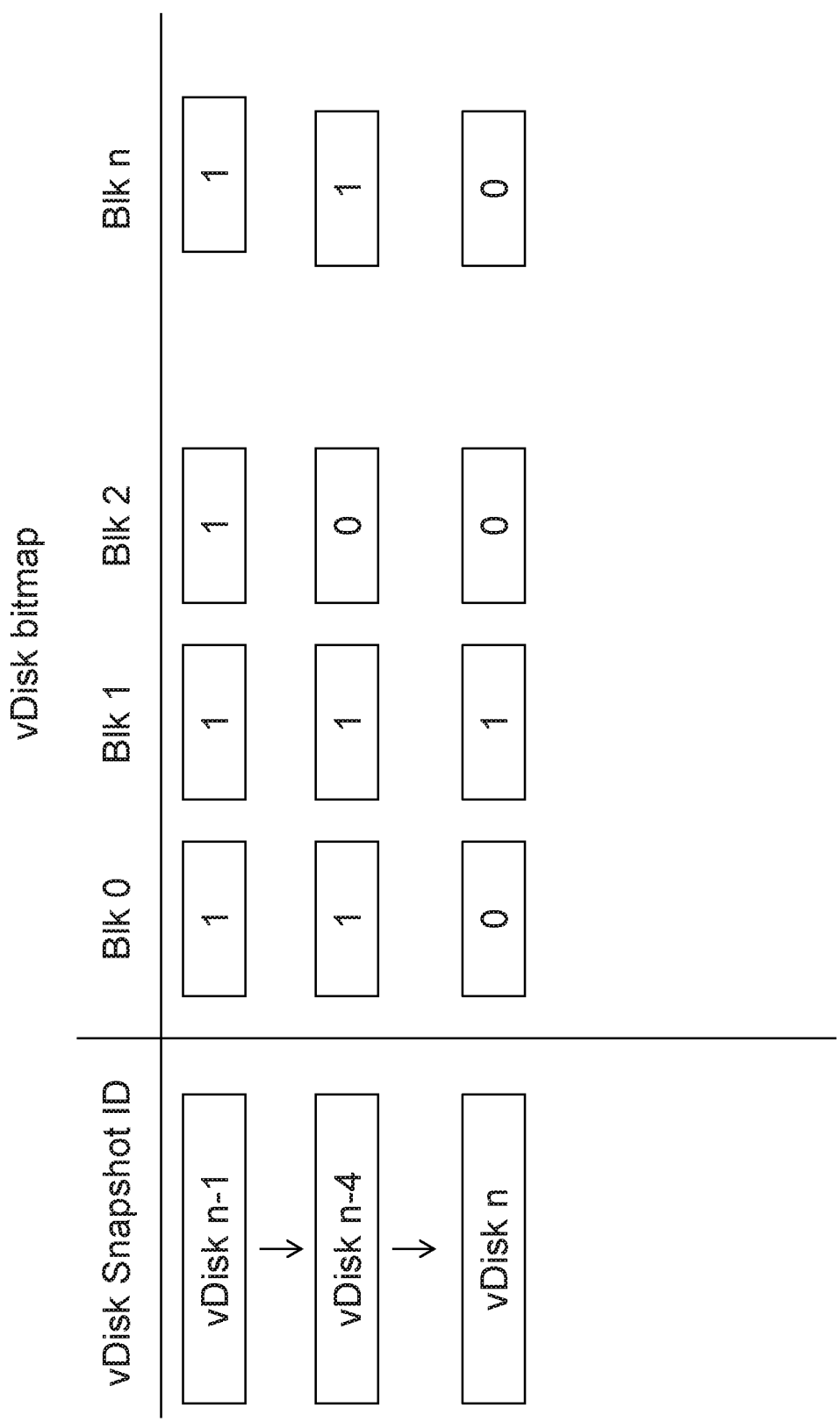
Figure 10C:
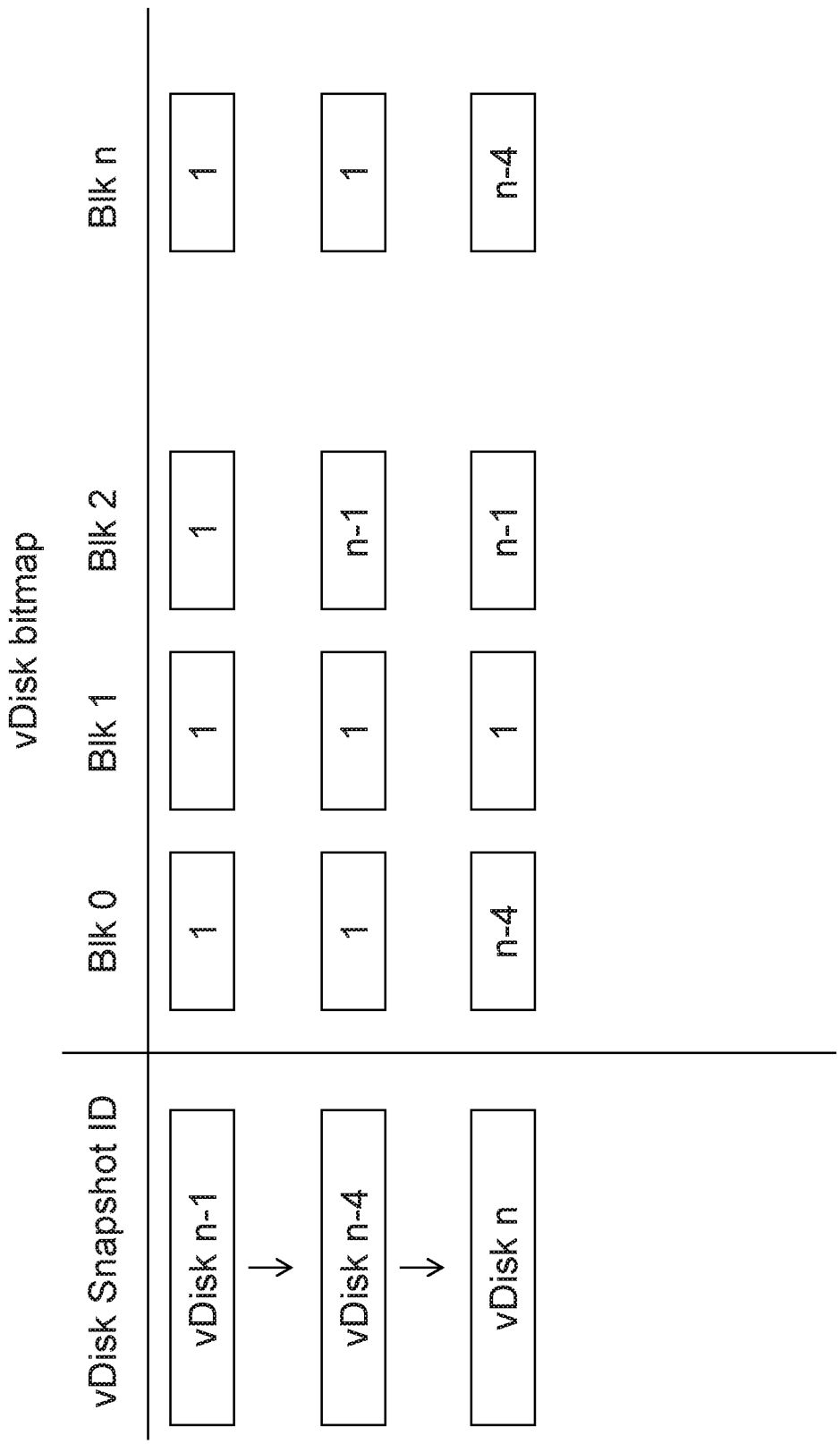

FIGS. 10A-C are schematic diagrams illustrating a method for merging vDisk snapshots in accordance with some embodiments. As described above, initially vDisk snapshots to be merged are identified. In our example, the vDisk snapshots to be merged are vDisk snapshots vDisk n-2 and vDisk n-3 from FIG. 3C. The vDisk snapshots may be individually merged, or may alternatively be merged in a single operation. Although FIG. 10A illustrates the margining of consecutive vDisk snapshots in a chain, it is important to note that the vDisk snapshots to be merged may be non-consecutive vDisk snapshots in a chain.

After the vDisk snapshots to be merged have been identified, entries in the vDisk Block Map corresponding to those identified vDisk snapshots are collapsed. Collapsing entries in the vDisk Block Map involves transferring metadata for blocks in the entry to be deleted to a nearest child entry that will remain after the merge is complete. FIG. 10A illustrates the result of collapsing vDisk Block Map entries for vDisk snapshots vDisk n-2 and vDisk n-3.

Prior to performing the merge operation, the vDisk Block Map entry for snapshot vDisk n-4 only included metadata for block n, the vDisk Block Map entry for snapshot vDisk n-3 included only metadata for blocks 0 and n, and the vDisk Block Map entry for snapshot vDisk n-2 included only metadata for block 1. After the merge operation, the metadata in the vDisk Block Map entries for snapshots vDisk n-3 and vDisk n-2 are transferred to their nearest child entry (i.e., vDisk n-4) that remains after the merge. Thus, after the merge, the vDisk Block Map entry for snapshot vDisk n-4 includes metadata for blocks 0, 1 and n.

Additionally, after the vDisk snapshots to be merged have been identified, entries in the vDisk Block Mapping Structure (e.g., vDisk Block Bitmap or vDisk Block Reference Map) corresponding to those identified vDisk snapshots are collapsed.

Where the mapping structure is a vDisk Block Bitmap, collapsing entries involves transferring bits for blocks in the entry to be deleted to a nearest child entry that will remain after the merge is complete. FIG. 10B illustrates the result of collapsing vDisk Block Bitmap entries for vDisk snapshots vDisk n-2 and vDisk n-3.

Prior to performing the merge operation, the bitmap entry for snapshot vDisk n-4 only included an on-bit for block n, the bitmap entry for snapshot vDisk n-3 included only an on-bit for blocks 0 and n, and the bitmap entry for snapshot vDisk n-2 included only an on-bit for block 1. After the merge operation, the bitmap entries for snapshots vDisk n-3 and vDisk n-2 are transferred to their nearest child entry (i.e., vDisk n-4) that remains after the merge. Thus, after the merge, the bitmap entry for snapshot vDisk n-4 includes an on-bit for blocks 0, 1 and n.

Thus, after collapsing vDisk Block Bitmap entries for vDisk snapshots vDisk n-2 and vDisk n-3, the collapsed vDisk Block Bitmap accurately corresponds to the collapsed vDisk Block Map.

Where the mapping structure is a vDisk Block Reference map, collapsing entries involves transferring values (e.g., IDs) for blocks in the entry to be deleted to a nearest child entry that will remain after the merge is complete. FIG. 10C illustrates the result of collapsing vDisk Block Reference map entries for vDisk snapshots vDisk n-2 and vDisk n-3.

Prior to performing the merge operation, the Reference map entry for snapshot vDisk n-4 included a value for block 0 that identifies snapshot vDisk n-3 as the closest ancestor snapshot where metadata for that block can be found, a value for block 1 that identifies snapshot vDisk n-2 as the closest ancestor snapshot where metadata for that block can be found, a value for block 2 that identifies snapshot vDisk n-1 as the closest ancestor snapshot where metadata for that block can be found, and a value for block n that identifies itself as the closest ancestor snapshot where metadata for that block can be found.

Likewise, prior to performing the merge operation, the Reference map entry for snapshot vDisk n-3 included a value for block 0 that identifies itself as the closest ancestor snapshot where metadata for that block can be found, a value for block 1 that identifies snapshot vDisk n-2 as the closest ancestor snapshot where metadata for that block can be found, a value for block 2 that identifies snapshot vDisk n-1 as the closest ancestor snapshot where metadata for that block can be found, and a value for block n that identifies itself as the closest ancestor snapshot where metadata for that block can be found.

Similarly, prior to performing the merge operation, the Reference map entry for snapshot vDisk n-2 included a value for block 0 that identifies snapshot vDisk n-1 as the closest ancestor snapshot where metadata for that block can be found, a value for block 1 that identifies itself as the closest ancestor snapshot where metadata for that block can be found, a value for block 2 that identifies snapshot vDisk n-1 as the closest ancestor snapshot where metadata for that block can be found, and a value for block n that identifies snapshot vDisk n-1 as the closest ancestor snapshot where metadata for that block can be found.

After the merge operation, the Reference map entries for snapshots vDisk n-3 and vDisk n-2 are transferred to their nearest child entry (i.e., vDisk n-4) that remains after the merge. Thus, after the merge, the Reference map entry for snapshot vDisk n-4 includes a value for block 0 that identifies itself as the closest ancestor snapshot where metadata for that block can be found, a value for block 1 that identifies itself as the closest ancestor snapshot where metadata for that block can be found, a value for block 2 that identifies snapshot vDisk n-1 as the closest ancestor snapshot where metadata for that block can be found, and a value for block n that identifies snapshot itself as the closest ancestor snapshot where metadata for that block can be found.

Thus, after collapsing vDisk Block Reference map entries for vDisk snapshots vDisk n-2 and vDisk n-3, the collapsed vDisk Block Reference map accurately corresponds to the collapsed vDisk Block Map.

System Architecture

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in storage medium 1431 may be accessed through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for obtaining metadata for a virtual disk (vDisk) using a mapping structure in a virtualized storage environment, comprising:

receiving a request for an I/O operation on a vDisk;

determining whether an entry corresponding to the vDisk is available in a mapping structure, the mapping structure configured to identify a relevant entry in the mapping structure that contains metadata for fulfilling the I/O operation, wherein the mapping structure comprises a higher hierarchical level corresponding to a parent snapshot and a lower hierarchical level corresponding to a child snapshot for the vDisk, the higher hierarchical level having parent metadata for a first write operation implemented in the parent snapshot and the lower hierarchical level having child metadata for a second write operation implemented in the child snapshot;

obtaining a location of the metadata in the mapping structure by retrieving the entry in the mapping structure upon determination that the entry is available in the mapping structure; and traversing the mapping structure between the lower hierarchical level and the higher hierarchical level to locate the metadata upon determination that the entry is not available in the mapping structure.

2. The method of claim 1, wherein the entry in the mapping structure is lazily generated in the mapping structure for a snapshot, wherein the entry includes a value for each block in the snapshot, wherein the value indicates a presence of the metadata in the mapping structure for the block or an absence of the metadata, wherein a background process lazily generates the entry in the mapping structure for the snapshot at a later time after taking the snapshot.

3. The method of claim 1, wherein the mapping structure is a vDisk Block Map.

4. The method of claim 1, wherein the mapping structure is a vDisk Block Reference Map, the vDisk Block Reference Map comprising:

entries represented as rows, wherein each entry corresponds to a row for each vDisk snapshot, and a plurality of columns corresponding to a plurality of blocks of data for the entries.

5. The method of claim 4, wherein the entries comprise an ID of the parent snapshot that has the metadata associated with each block of a particular entry, wherein a value of 0 indicates no metadata for a respective block of the particular entry.

6. The method of claim 1, wherein the mapping structure is a vDisk Block Bitmap, the vDisk Block Bitmap comprising:

entries represented as rows, wherein each entry corresponds to a row for each vDisk snapshot, and a plurality of columns having a bit value in each column that corresponds to a respective block of data for the entries.

7. The method of claim 6, wherein a column in each entry comprises:

an on-bit indicating a presence of a corresponding entry in the mapping structure for a particular block, or an off-bit indicating an absence of a corresponding entry in the mapping structure for a particular block.

8. A computer program product embodied on a non-transitory computer readable medium, the non-transitory computer readable medium having stored thereon a sequence of instructions which, when executed by a processor causes the processor to execute a method for obtaining metadata for a virtual disk (vDisk) using a mapping structure in a virtualized storage environment, the method comprising:

receiving a request for an I/O operation on a vDisk;
determining whether an entry corresponding to the vDisk is available in a mapping structure, the mapping structure configured to identify a relevant entry in the mapping structure that contains metadata for fulfilling the I/O operation, wherein the mapping structure comprises a higher hierarchical level corresponding to a parent snapshot and a lower hierarchical level corresponding to a child snapshot for the vDisk, the higher hierarchical level having parent metadata for a first write operation implemented in the parent snapshot and the lower hierarchical level having child metadata for a second write operation implemented in the child snapshot;
obtaining a location of the metadata in the mapping structure by retrieving the entry in the mapping structure upon determination that the entry is available in the mapping structure; and
traversing the mapping structure between the lower hierarchical level and the higher hierarchical level to locate the metadata upon determination that the entry is not available in the mapping structure.

9. The computer program product of claim 8, wherein the entry in the mapping structure is lazily generated in the mapping structure for a snapshot, wherein the entry includes a value for each block in the snapshot, wherein the value indicates a presence of the metadata in the mapping structure for the block or an absence of the metadata, wherein a background process lazily generates the entry in the mapping structure for the snapshot at a later time after taking the snapshot.

10. The computer program product of claim 8, wherein the mapping structure is a vDisk Block Map.

11. The computer program product of claim 8, wherein the mapping structure is a vDisk Block Reference Map, the vDisk Block Reference Map comprising:
 entries represented as rows, wherein each entry corresponds to a row for each vDisk snapshot, and
 a plurality of columns corresponding to a plurality of blocks of data for the entries.

12. The computer program product of claim 11, wherein the entries comprise an ID of the parent snapshot that has the metadata associated with each block of a particular entry, wherein a value of 0 indicates no metadata for a respective block of the particular entry.

13. The computer program product of claim 8, wherein the mapping structure is a vDisk Block Bitmap, the vDisk Block Bitmap comprising:
 entries represented as rows, wherein each entry corresponds to a row for each vDisk snapshot, and
 a plurality of columns having a bit value in each column that corresponds to a respective block of data for the entries.

14. The computer program product of claim 13, wherein a column in each entry comprises:
 an on-bit indicating a presence of a corresponding entry in the mapping structure for a particular block, or
 an off-bit indicating an absence of a corresponding entry in the mapping structure for a particular block.

15. A system, comprising:
a processor; and
a memory comprising computer code executed using the processor, in which the computer code implements a method for obtaining metadata for a virtual disk (vDisk) using a mapping structure in a virtualized storage environment, the method comprising:
receiving a request for an I/O operation on a vDisk;
determining whether an entry corresponding to the vDisk is available in a mapping structure, the mapping structure configured to identify a relevant entry in the mapping structure that contains metadata for fulfilling the I/O operation, wherein the mapping structure comprises a higher hierarchical level corresponding to a parent snapshot and a lower hierarchical level corresponding to a child snapshot for the vDisk, the higher hierarchical level having parent metadata for a first write operation implemented in the parent snapshot and the lower hierarchical level having child metadata for a second write operation implemented in the child snapshot;
obtaining a location of the metadata in the mapping structure by retrieving the entry in the mapping structure upon determination that the entry is available in the mapping structure; and
traversing the mapping structure between the lower hierarchical level and the higher hierarchical level to locate the metadata upon determination that the entry is not available in the mapping structure.

16. The system of claim 15, wherein the entry in the mapping structure is lazily generated in the mapping structure for a snapshot, wherein the entry includes a value for each block in the snapshot, wherein the value indicates a presence of the metadata in the mapping structure for the block or an absence of the metadata, wherein a background process lazily generates the entry in the mapping structure for the snapshot at a later time after taking the snapshot.

17. The system of claim 15, wherein the mapping structure is a vDisk Block Map.

18. The system of claim 15, wherein the mapping structure is a vDisk Block Reference Map, the vDisk Block Reference Map comprising:
 entries represented as rows, wherein each entry corresponds to a row for each vDisk snapshot, and
 a plurality of columns corresponding to a plurality of blocks of data for the entries.

19. The system of claim 18, wherein the entries comprise an ID of the parent snapshot that has the metadata associated with each block of a particular entry, wherein a value of 0 indicates no metadata for a respective block of the particular entry.

20. The system of claim 15, wherein the mapping structure is a vDisk Block Bitmap, the vDisk Block Bitmap comprising:
 entries represented as rows, wherein each entry corresponds to a row for each vDisk snapshot, and
 a plurality of columns having a bit value in each column that corresponds to a respective block of data for the entries.

21. The system of claim 20, wherein a column in each entry comprises:
 an on-bit indicating a presence of a corresponding entry in the mapping structure for a particular block, or
 an off-bit indicating an absence of a corresponding entry in the mapping structure for a particular block.

* * * * *